(12) United States Patent
Castorina et al.

(10) Patent No.: US 12,399,833 B2
(45) Date of Patent: Aug. 26, 2025

(54) PREFETCHING USING GLOBAL OFFSET DIRECTION TRACKING CIRCUITRY

(71) Applicant: Arm Limited, Cambridge (GB)

(72) Inventors: Ugo Castorina, Antibes (FR); Diogo Augusto Pereira Marques, Antibes (FR); Damien Matthieu Valentin Cathrine, Mougins (FR); Christophe Marie Pitelet, Biot (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/411,614

(22) Filed: Jan. 12, 2024

(65) Prior Publication Data

US 2025/0231881 A1   Jul. 17, 2025

(51) Int. Cl.
*G06F 12/0862*   (2016.01)
*G06F 12/0877*   (2016.01)

(52) U.S. Cl.
CPC ...... *G06F 12/0862* (2013.01); *G06F 12/0877* (2013.01)

(58) Field of Classification Search
CPC ............. G06F 12/0862; G06F 12/0877; G06F 9/30047; G06F 9/3802
USPC ........................................................ 711/137
See application file for complete search history.

(56) References Cited

U.S. PATENT DOCUMENTS

2015/0278099 A1* 10/2015 Jain ..................... G06F 12/0862
                                                        711/137
2020/0097409 A1*  3/2020 Nathella ............. G06F 9/30043

OTHER PUBLICATIONS

Pierre Michaud, Best-Offset Hardware Prefetching, HAL Open Science, submitted Jan. 13, 2017, 13 pages.

* cited by examiner

*Primary Examiner* — Jared I Rutz
*Assistant Examiner* — Wei Ma
(74) *Attorney, Agent, or Firm* — NIXON & VANDERHYE P.C.

(57) ABSTRACT

An apparatus comprises prefetcher circuitry to perform prefetching. In the prefetching: prefetcher training is performed to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset; one or more selected offsets are selected based on the offset scores; and prefetch requests are generated based on the selected offset(s). Global offset direction tracking circuitry maintains a global offset direction indicator indicative of a global offset direction, based on whether offset-matching instances are detected as occurring more frequently for a positive-direction subset of the candidate offsets or for a negative-direction subset of the candidate offsets. The prefetcher circuitry adapts the prefetching based on the global offset direction indicator.

20 Claims, 11 Drawing Sheets

Global offset direction tracking

Global offset direction indicator maintenance

Adjusting offset selection based on global offset direction

Adjusting prefetch generation based on global offset direction

PREFETCHING USING GLOBAL OFFSET DIRECTION TRACKING CIRCUITRY

BACKGROUND

Technical Field

The present technique relates to the field of data processing. More particularly, it relates to prefetching.

Technical Background

A prefetcher may perform prefetching, to generate a prefetch request requesting that information associated with a given address is prefetched into a cache. The prefetch request may be generated based on a prediction of addresses which may be specified in future by demand memory access requests generated by processing circuitry in response to execution of load/store instructions.

SUMMARY

At least some examples of the present technique provide an apparatus comprising:
  prefetcher circuitry to perform prefetching, the prefetching comprising:
    performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
    selecting, based on the offset scores for the plurality of candidate offsets, one or more selected offsets; and
    generating prefetch requests using the one or more selected offsets;
  and
  global offset direction tracking circuitry to maintain a global offset direction indicator indicative of a global offset direction; in which:
  in response to detecting that the offset-matching instances are detected as occurring more frequently for a positive-direction subset of the candidate offsets than for a negative-direction subset of the candidate offsets, the global offset direction tracking circuitry is configured to set the global offset direction indicator to indicate a positive offset direction as the global offset direction;
  in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and
  the prefetcher circuitry is configured to adapt the prefetching based on the global offset direction indicator.

At least some examples of the present technique provide a system comprising:
  the apparatus described above, implemented in at least one packaged chip;
  at least one system component; and
  a board,
  wherein the at least one packaged chip and the at least one system component are assembled on the board.

At least some examples of the present technique provide a chip-containing product comprising the system described above assembled on a further board with at least one other product component.

At least some examples of the present technique provide a method comprising:
  performing prefetching, the prefetching comprising:
    performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
    selecting, based on the offset scores for the plurality of candidate offsets, one or more selected offsets; and
    generating prefetch requests using the one or more selected offsets;
  maintaining a global offset direction indicator indicative of a global offset direction;
  in response to detecting that the offset-matching instances are detected as occurring more frequently for a positive-direction subset of the candidate offsets than for a negative-direction subset of the candidate offsets, setting the global offset direction indicator to indicate a positive offset direction as the global offset direction;
  in response to detecting that the offset-matching instances are detected as occurring more frequently for the negative-direction subset of the candidate offsets than for the positive-direction subset of the candidate offsets, setting the global offset direction indicator to indicate a negative offset direction as the global offset direction; and
  adapting the prefetching based on the global offset direction indicator.

At least some examples of the present technique provide a non-transitory computer-readable medium to store computer-readable code for fabrication of an apparatus comprising:
  prefetcher circuitry to perform prefetching, the prefetching comprising:
    performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
    selecting, based on the offset scores for the plurality of candidate offsets, one or more selected offsets; and
    generating prefetch requests using the one or more selected offsets;
  and
  global offset direction tracking circuitry to maintain a global offset direction indicator indicative of a global offset direction; in which:
  in response to detecting that the offset-matching instances are detected as occurring more frequently for a positive-direction subset of the candidate offsets than for a negative-direction subset of the candidate offsets, the global offset direction tracking circuitry is configured to set the global offset direction indicator to indicate a positive offset direction as the global offset direction;
  in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and the prefetcher circuitry is configured to adapt the prefetching based on the global offset direction indicator.

Further aspects, features and advantages of the present technique will be apparent from the following description of examples, which is to be read in conjunction with the accompanying drawings.

DESCRIPTION OF EXAMPLES

Figure 1:
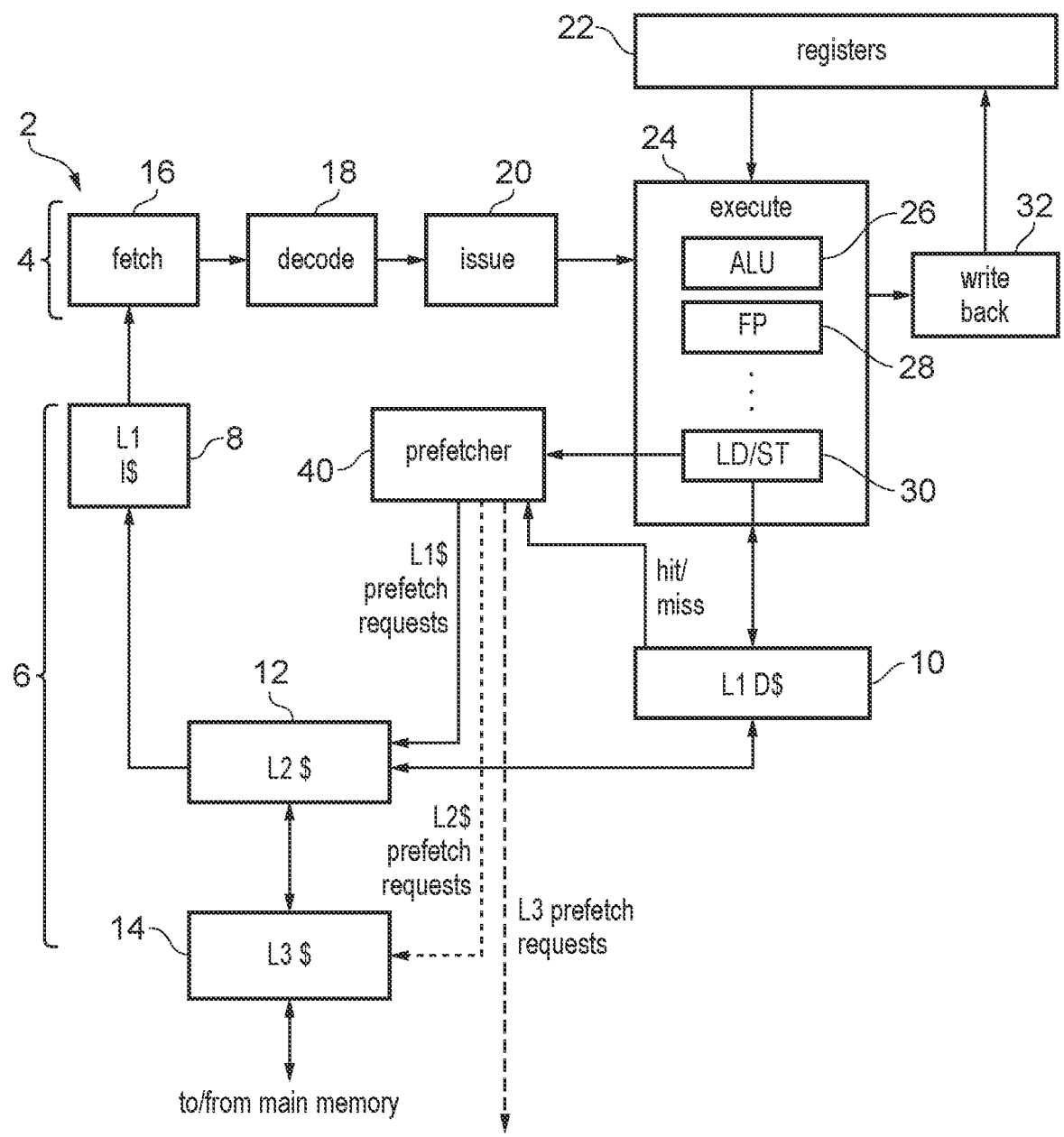
FIG. 1 illustrates an example of an apparatus having prefetcher circuitry.

Prefetcher circuitry may perform prefetching, the prefetching comprising:

performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;

selecting, based on the offset scores for the plurality of candidate offsets, one or more selected offsets; and generating prefetch requests using the one or more selected offsets.

Such a prefetcher can consider offset scores for a number of candidate offsets, to select the offsets considered the "best" offsets for which prefetch requests are predicted to be most beneficial to performance. The candidate offsets can include one or more positive-direction offsets (for which an offset-matching instance occurs where the difference between target addresses of current/previous memory access requests corresponds to that candidate offset and the target address of the current memory access request is greater than the target address of the previous memory access request) and one or more negative-direction offsets (for which an offset-matching instance occurs where the difference between target addresses of current/previous memory access requests corresponds to that candidate offset and the target address of the current memory access request is less than the target address of the previous memory access request). It can be useful to include both positive-direction offsets and negative-direction offsets in the set of candidate offsets tested in the prefetcher training, because there can be some software workloads where the stream of accesses (if processed in program order in absence of any reordering) traverses memory in ascending order of target address, and other software workloads where the stream of memory accesses traverses memory in descending order of target address. Hence, including both positive-direction and negative-direction offsets in the set of candidate offsets can be helpful to allow a single instance of prefetcher circuitry to be able to predict future access requests for both types of workloads.

However, a problem with such a prefetcher is that the series of memory access requests used for training could involve some reordering of one or more streams of accesses relative to program order. Such reordering could lead to instances where a particular offset is detected as having a high-ranking offset score, when that offset only arises as an artefact of the reordering and in fact each original stream of accesses in absence of reordering would not have required any series of accesses which would benefit from prefetching based on that particular offset.

For example, one source of such reordering could be due to out-of-order execution of instructions by a processor, which might lead to a stream of accesses whose addresses are actually in ascending order (with positive-direction offsets) or descending order (with negative-direction offsets) being detected as including some offset-matching instances for the opposite offset direction. Another source of reordering may be the interleaving of otherwise independent streams of accesses, where the offsets between a current access in one stream and a previous access seen from another stream might recurrently match a given one of the candidate offsets for a period, boosting the offset score for that candidate offset even though none of the original streams encounter that offset individually and once those streams are no longer being interleaved in the same manner, subsequent prefetching based on that candidate offset may not benefit performance.

Regardless of the particular cause of reordering, reordering of the order in which memory access requests are processed can lead to selection of a selected offset which, once used to generate prefetch requests, does not lead to any improvement in cache hit rates as the predictions based on the selected offset may not correspond to future addresses accessed on demand by processing circuitry. This can waste memory access bandwidth in processing redundant prefetch requests, and can also harm performance because the prefetch requests may cause other data to be evicted from caches, causing slower access to that data if subsequently required by demand memory accesses generated by the processing circuitry.

In the examples discussed below, global offset direction tracking circuitry is provided to maintain a global offset direction indicator indicative of a global offset direction. In response to detecting that the offset-matching instances are detected as occurring more frequently for a positive-direction subset of the candidate offsets than for a negative-direction subset of the candidate offsets, the global offset direction tracking circuitry sets the global offset direction indicator to indicate a positive offset direction as the global offset direction. In response to detecting that the offset-matching instances are detected as occurring more frequently for the negative-direction subset of the candidate offsets than for the positive-direction subset of the candidate offsets, the global offset direction tracking circuitry sets the global offset direction indicator to indicate a negative offset direction as the global offset direction. The prefetcher circuitry adapts the prefetching based on the global offset direction indicator.

Hence, a global offset direction indicator is maintained which gives a measure of whether offset-matching instances are cumulatively more frequent for a subset of positive-direction offsets or for a subset of negative-direction offsets. By considering the global trend in offset direction, and adapting the prefetching based on the global offset direction, the prefetcher can be more robust against noise caused by reordering, reducing the risk of prefetch inaccuracy. Hence, performance can be improved as it is less likely that useless prefetch requests are generated which cause cache pollution by evicting other useful data when the data replacing the useful data turns out not to be required by any subsequent demand access.

The prefetcher circuitry may adapt the prefetching based on the global offset direction indicator to reduce a likelihood that prefetch requests are generated based on an offset having a different offset direction to the global offset direction indicated by the global offset direction indicator. Hence, if the global offset direction indicates that the majority of offset-matching instances are for offsets having the positive offset direction, it may be less likely that prefetch requests are generated based on a negative-direction offset, and vice versa. As the offset-matching instances based on an offset direction in the opposite direction to the global offset direction are more likely to be artefacts of reordering than real offsets encountered in the streams of accesses generated by the executed software workloads, this approach can improve processing performance by increasing the fraction of prefetch requests generated that correspond to addresses subsequently required by a demand memory access request.

There can be a number of ways in which the prefetcher circuitry could adapt the prefetching based on the global offset direction indicator. The prefetching may include a number of functions, including prefetcher training, offset selection and prefetch generation, and any one or more of these functions could be adapted based on the global offset direction indicator.

In some examples, the prefetcher circuitry may adapt the prefetcher training based on the global offset direction indicator. For example, the function or algorithm used to derive the offset score for a given candidate offset could depend on the global offset direction indicator.

For example, in response to an offset-matching instance being detected as occurring for a given candidate offset corresponding to a given offset score, the prefetcher circuitry may adjust, depending on whether the given candidate offset has a different offset direction to the global offset direction indicated by the global offset direction indicator, an amount by which the given offset score is updated in response to detection of the offset-matching instance. In particular, the given offset score may be updated by a greater amount when the given candidate offset has the same offset direction as the global offset direction than when the given candidate offset has the opposite offset direction to the global offset direction. With this approach, candidate offsets which have the same offset direction as the global offset direction (i.e. positive-direction candidate offsets if the global offset direction is positive or negative-direction candidate offsets if the global offset direction is negative) are more likely to have better-ranking offset scores than candidate offsets which have a different offset direction to the global offset direction (i.e. negative-direction candidate offsets if the global offset direction is positive or positive-direction candidate offsets if the global offset direction is negative). Therefore, the candidate offsets having the same offset direction as the global offset direction are more likely to be selected as a selected offset for use in prefetch generation, reducing the likelihood of a prefetch request being generated based on an offset having the opposite direction to the global offset direction.

In some examples, in response to the offset-matching instance being detected as occurring for a given candidate offset corresponding to a given offset score:
  when the given candidate offset has a same offset direction as the global offset direction indicated by the global offset direction indicator, the prefetcher circuitry is configured to boost the given offset score by a greater amount when a time between the previous memory access request and the current memory access request meets a timeliness condition than when the time between the previous memory access request and the current memory access request does not meet the timeliness condition; and.
  when the given candidate offset has a different offset direction to the global offset direction indicated by the global offset direction indicator, the prefetcher circuitry is configured to boost the given offset score by an amount corresponding to the timeliness condition not being met, even if the timeliness condition is actually met for that offset-matching instance.

Considering the timeliness condition can be useful to improve the performance boost provided by prefetching, as it reduces likelihood of wasting prefetch bandwidth on generating prefetch requests for addresses which, even if they are correctly predicted as being required by a subsequent demand access request, are nevertheless not helpful to performance because by the time the prefetched data is allocated into the cache, the corresponding demand access request has already happened and already missed in the cache. It may be preferable to priorities generation of prefetch requests which can prefetch sufficiently in advance of the corresponding demand access request that the prefetched data is available in the cache before the demand access request is received. Hence, it can be useful to provide a greater boost to the offset score for offset-matching instances where the time between the previous memory access request and the current memory access request meets a timeliness condition. The timeliness condition could be considered met when the time between the previous memory access request and the current memory access request is greater than a threshold time. The threshold time could, for example, correspond to an estimated prefetch turnaround time corresponding to the time between issuing a prefetch request and allocation of data into a given level of cache in response to that prefetch request. The estimated prefetch turnaround time could be a variable time, which is determined based on a prefetch-turnaround metric which tracks the prefetch-turnaround time encountered for one or more previous prefetch access requests.

In implementations where such a timeliness condition is considered so that a greater boost is applied to the offset score when the timeliness condition is met than when the timeliness condition is not met, the circuit logic for implementing different levels of boost to the given offset score can be reused to also provide for different levels of boost depending on whether the given candidate offset has a different offset direction to the global offset direction, by treating instances when the given candidate offset has a different offset direction to the global offset direction as if the timeliness condition is not met, even if the timeliness condition would actually have been met. Hence, for an offset-matching instance involving a candidate offset of opposite offset direction to the global offset direction, the timeliness boost is disabled even if the time between the current memory access request and the previous memory access request would have met the timeliness condition. This approach can reduce the total amount of circuitry needed for implementing the combination of the timeliness boost and the boost dependent on the global offset direction.

Other implementations might not consider the timeliness condition, or even if the timeliness condition is considered could use an offset score updating function for which the amount by which the offset score is boosted in the case of the offset direction being opposite to the global offset direction is different to the amount by which the offset score is boosted in the case of the timeliness condition not being met when the offset direction is the same as the global offset direction. Hence, it will be appreciated that the above example is one way of implementing the offset score updating functions, but there can also be other ways of implementing the circuitry to control that an offset-matching instance for a candidate offset whose direction matches the global offset direction causes a greater boost to that candidate offset's offset score than the amount by which the offset score would have been boosted for an offset-matching instance involving a candidate offset with an offset direction is opposite to the global offset direction.

Another part of the prefetching process may be offset selection. The offset selection selects one or more of the candidate offsets based on the offset scores maintained through performing the offset training. In some examples, higher numeric values of offset scores could be considered higher-ranking than lower numeric values of offset scores. Other examples could enumerate the offset scores in the opposite direction, so that offset scores with a lower numeric value are considered higher ranking than offset scores with higher numeric values. Some implementations may support only a single candidate offset being selected as the selected candidate offset to be used for prefetch generation. Other examples, may support two or more offsets being selected in a given round of offset selection, so that for subsequent prefetch generation prefetch requests could be generated based on two or more different offsets applied to addresses of prefetch trigger requests. In some examples, the selected one or more candidate offsets could simply be those having the one or more highest-ranking offset scores. However, other examples may use a more complex offset selection algorithm. For example, it is possible to select a candidate offset which is a lowest common multiple of two or more candidate offsets which have offset scores meeting a score selection condition. For example, if candidate offsets +4 and +6 have relatively high-ranking scores, to make best use of limited memory access bandwidth, it may be determined that an offset of +12 (the lowest common multiple of +4 and +6) could be a better candidate to either +4 or +6 as using +12 as the offset may be of benefit to both the +4 stream and the +6 stream.

In some examples, the prefetcher circuitry may adapt selection of the one or more selected offsets based on the global offset direction indicator. Again, this helps reduce the likelihood that useless prefetch requests which do not benefit performance are generated by the prefetcher circuitry.

For example, the prefetcher circuitry may bias selection of the one or more selected offsets to provide a higher likelihood that a candidate offset with a same offset direction as the global offset direction is selected as one of the one or more selected offsets than that a candidate offset with a different offset direction to the global offset direction is selected as one of the one or more selected offsets. In some examples, the prefetcher circuitry could entirely suppress selection of candidate offsets with opposite offset direction to the global offset direction, e.g. only allowing candidate offsets with the same offset direction as the global offset direction to be selected for use in prefetch generation. However, other examples (especially if multiple offsets can be selected per round of offset selection) may support some ability to select a candidate offset whose offset direction is opposite to the global offset direction, but with a lower probability of such opposite-direction candidate offsets being selected. For example, in each cycle of offset selection, the offset selection may select a maximum of N same-direction candidate offsets (with the same offset direction as the global offset direction) and a maximum of M opposite-direction candidate offsets (with the opposite offset direction to the global offset direction), where N>M so that the probability of selection is higher for the same-direction candidate offsets than for the opposite-direction candidate offsets.

Although often the global offset direction indicator may indicate a strong preference for either negative-direction offsets or positive-direction offsets (since many software workloads may have much more frequent occurrences of offsets in one direction than the other), there can also be some scenarios in which the global offset direction indicator may not indicate a strong preference for offsets in either the positive direction or negative direction. If there is no strong preference for either positive or negative offset direction, it can be useful for the prefetcher circuitry to use a different approach to prefetching than when the global offset direction is more strongly indicated as the positive offset direction or more strongly indicated as the negative offset direction.

Hence, the prefetcher circuitry may detect whether the global offset direction indicator satisfies a similar-frequency condition indicative of a difference between a frequency of offset-matching instances for the positive-direction subset of offsets and a frequency of offset-matching instances for the negative-direction subset of offsets being less than a threshold. For example, if the global offset direction indicator is a global direction counter whose counter value is adjusted in a first direction in response to offset-matching instances for the positive-direction subset of offsets and in a second direction in response to offset-matching instances for the negative-direction subset of offsets, then the similar-frequency condition could be detected when the current value of the global direction counter is in a mid-region of the counter's range, the mid-region comprising values of the global direction counter that are less than a certain threshold difference from a value representing equal frequencies of occurrence of offset-matching instances for the positive-direction and negative-direction subsets of offsets.

In some examples, in response to detection that the global offset direction indicator satisfies the similar-frequency condition, the prefetcher circuitry may select, as a plurality of selected offsets selected from among the candidate offsets, at least one positive-direction offset and at least one negative-direction offset. Hence, if the prefetcher circuitry supports multiple offsets being selected in the same cycle of offset selection, it can be useful to ensure that the selected offsets include both positive and negative offsets in cases where the global offset direction indicator satisfies the similar-frequency condition. For example, when the similar-frequency condition is not satisfied, the offset selection could be based on selecting the N offsets with the highest-ranking offset scores (where N is 2 or more), so that if the N highest-ranking offset scores all occur for positive-direction offsets then no negative-direction offsets would be selected while when the N highest-ranking offset scores all occur for negative-direction offsets then no positive-direction offsets would be selected. However, when the similar-frequency condition is satisfied, the offset selection could select P positive-direction offsets with the highest-ranking offset scores among the set of positive-direction offsets, and Q negative-direction offsets with the highest-ranking offset scores among the set of negative-direction offsets, where P and Q are both greater than or equal to 1 and P+Q=N. In this way, in cases where the global direction shows no strong preference for either offset direction, ensuring selection of at least one positive-direction offset and at least one negative-direction offset may be more likely to provide better performance than if all the selected offsets are of the same offset direction.

In some examples, the prefetcher circuitry may adapt generation of the prefetch requests based on the global offset direction indicator. This could be applied in examples where there is no adaptation of the prefetcher training or offset selection based on the global offset direction indicator, or in examples where the adaptation of prefetch generation based on the global offset direction indicator is in addition to adaptation of prefetcher training and/or offset selection based on the global offset direction indicator. Adaptation of prefetch generation gives another way of biasing the extent to which prefetch requests are generated with a different offset direction to the global offset direction.

For example, the prefetcher circuitry may suppress generation of prefetch requests based on a selected offset having a different offset direction to the global offset direction indicated by the global offset direction indicator. Hence, even if an opposite-direction offset (positive offset if the global direction is negative or negative offset if the global direction is positive) is selected as one of the "best" selected offsets based on the offset scores, the prefetcher circuitry may nevertheless prevent any prefetch requests being generated based on that offset. This reduces the likelihood of cache pollution based on prefetch requests generated due to offsets which achieve high ranking offset scores purely as a result of reordering artefacts.

Another way of adapting prefetch generation based on the global offset direction can be to consider the similar-frequency condition. At least when a bandwidth congestion condition is satisfied, in response to detection of the global offset direction indicator satisfying a similar-frequency condition indicative of a difference between a frequency of offset-matching instances for the positive-direction subset of offsets and a frequency of offset-matching instances for the negative-direction subset of offsets being less than a threshold, the prefetcher circuitry may suppress generation of prefetch requests based on any of the one or more selected offsets. This recognises that if the global offset direction indicator shows no strong preference for either positive-direction offsets or negative-direction offsets, the global offset direction is unlikely to give a good prediction of which offsets are due to real behaviour of software workloads and which offsets are selected due to reordering artefacts, so generating prefetch requests in this scenario may cause a significant fraction (e.g. around half) of the generated prefetch requests to be useless prefetches causing cache pollution. Particularly if there is a bandwidth restriction, it is likely that issuing prefetch requests in this scenario may harm performance by delaying demand access requests and causing cache pollution. Therefore, it may be better when the bandwidth congestion condition and similar-frequency condition are both satisfied to suppress generation of prefetch requests based on both positive-direction and negative-direction offsets (e.g. to turn off altogether generation of any prefetch requests by this particular instance of the prefetcher circuitry—note it is still possible that other prefetchers in the same system may continue generating prefetch requests). With this approach, performance can be improved by conserving memory system bandwidth and reducing cache pollution in cases where there is uncertainty on whether negative or positive offsets are preferred.

Regardless of whether the adaptation based on the global offset direction indicator is applied to prefetcher training, offset selection and/or prefetch generation, in some examples the global offset direction indicator may be implemented using a global offset direction counter. The global offset direction tracking circuitry may adjust the global offset direction counter in a first direction in response to a predetermined event dependent on at least one offset-matching instance being detected as occurring for one of the positive-direction subset of offsets, and may adjust the global offset direction counter in a second direction in response to the predetermined event occurring for one of the negative-direction subset of offsets. Such a counter and its associated control logic can be relatively efficient to implement in terms of circuit area, and provides a relative indication of whether offset-matching instances occur cumulatively more frequently for the positive-direction subset of offsets or the negative-direction subset of offsets.

There can be different ways of implementing the predetermined event used to trigger an update to the global offset direction counter. In some examples, for a given candidate offset associated with a given offset score, the predetermined event comprises occurrence of an offset-matching instance for the given candidate offset. With this approach, when an offset-matching instance is detected for one of a positive-direction subset of offsets, then the global offset direction counter can be adjusted in the first direction (e.g. one of incremented or decremented), and when an offset-matching instance is detected for one of a negative-direction subset of offsets, then the global offset direction counter can be adjusted in the second direction (e.g. the opposite one of incremented or decremented).

Note that, in examples where the update to the offset score based on the detection of the offset-matching instance for the given candidate offset also depends on the timeliness condition, the update to the global offset direction counter in response to the offset-matching instance for the given candidate offset can be made independent of whether the timeless condition is satisfied. This recognises that even if a given offset-matching instance occurs where the separation in time between the previous and current memory accesses is too short to allow a useful prefetch to be generated, that offset-matching instance can still give useful information on global offset direction, so it may be desirable to ignore the evaluation of the timeliness condition when determining how to update the global offset direction counter.

In other examples, the global offset direction counter may not necessarily be updated for every occurrence of an offset-matching instance for the given candidate offset which is a member of one of the positive-direction subset of offsets or the negative-direction subset of offsets. For some implementations, the predetermined event associated with a given candidate offset (whose occurrence triggers an adjustment to the global offset direction counter) could be the given offset score for the given candidate offset reaching or exceeding a threshold score. For example, this may cause the global offset direction counter to track the relative number of positive-direction/negative-direction offsets which have encountered more than a threshold number of offset-matching events. By filtering out updates to the global offset direction counter based on candidate offsets which have encountered very few offset-matching events, this can reduce the noisiness of the global direction counter (increasing likelihood that the global offset direction is more reliable), and hence improve performance. Also this may reduce the frequency with which the global offset direction counter is updated, saving power.

It will be appreciated that the global offset direction indicator does not need to provide a precise indication of the difference in frequency of occurrence between offset-matching instances for the positive-direction subset of candidate offsets and the offset-matching instances for the negative-direction subset of candidate offsets. There can be some imprecision in the global offset direction indicator. For example, if the global offset direction counter tracks the difference between the number of positive-direction offsets reaching a threshold offset score and the number of negative-direction offsets reaching the threshold offset score, while this gives an approximate measure of the relative frequency of occurrence of offset-matching instances for each subset of offsets, this does not necessarily track the exact frequencies of occurrence. Hence, an imprecise metric can be sufficient to give useful information on offset direction to help the prefetcher improve performance by reducing the likelihood of prefetch requests being generated based on offsets with the opposite offset direction relative to the general trend in offset direction.

In some examples, the positive-direction subset of candidate offsets may comprise all candidate offsets with a positive offset direction, and/or the negative-direction subset of candidate offsets may comprise all candidate offsets with a negative offset direction.

However, some examples may maintain the global offset direction indicator based on occurrence of offset matching events for a proper subset of positive-direction offsets and/or a proper subset of negative-direction offsets, so that there may be some candidate offsets (with either positive or negative direction) that do not contribute to the maintenance of the global offset direction indicator.

For example, the positive-direction subset of candidate offsets may comprise candidate offsets with a positive offset direction and an offset magnitude exceeding a threshold magnitude; and the negative-direction subset of candidate offsets comprises candidate offsets with a negative offset direction and an offset magnitude exceeding the threshold magnitude. This recognises that it may be more likely that reordering artefacts cause false inflation of offset scores for offsets with smaller offset magnitudes than for offsets with larger offset magnitudes. For example, in an out-of-order processor, there may be a limited window of instructions which are able to be reordered relative to each other, based on the size of a reorder buffer or other structure for tracking out-of-order execution, and so when a series of memory access instructions if processed in program order would trigger accesses to a monotonically increasing or decreasing series of addresses, detection of offset-matching instances associated with offsets in the opposite direction may occur for lower-magnitude offsets which do not exceed a value corresponding to the difference between target addresses of the oldest and youngest memory access instructions able to be reordered relative to each other, but may not occur for higher-magnitude offsets which exceed this value. Hence, in some implementations it may be likely that offset-matching instances for candidate offsets with higher magnitudes are more likely to give a reliable indication of global offset direction than offset-matching instances for candidate offsets with lower magnitudes. By restricting maintenance of the global offset direction indicator to exclude offset matching events for candidate offsets of lower magnitude from causing updates of the global offset direction indicator, this can improve the accuracy of tracking global direction, and hence give a better improvement to performance.

The prefetcher circuitry may perform the prefetcher training in respective prefetcher periods, and select, based on the offset scores derived by performing the prefetcher training in a given prefetcher period, the one or more selected offsets to be used to generate prefetch requests in a subsequent prefetcher period. This approach enables the prefetcher to adapt to changes in behaviour by the workloads being monitored in the prefetcher training, but the period-based approach to training can be more stable than if changes in offset scores (which are potentially noisy) were immediately used to change offset selection.

In some examples, in response to elapse of a current prefetcher period, the global offset direction tracking circuitry may adjust the global offset direction indicator to reduce a confidence associated with identification of the global offset direction. For example, a value of the global offset direction counter may be reduced to a value part way (e.g. half way) between the current value of the global offset direction counter and a mid-point value of the global offset direction counter which represents the scenario where offset-matching instances are equally frequent for the positive-direction subset of offsets and the negative-direction subset of offsets. This approach can provide improved performance, because it applies some "aging" to the global offset direction counter so that it is less likely that a strong preference for a positive or negative direction seen some time ago is biasing prefetch generation later on when the workload behaviour may have changed, but nevertheless by not completely discarding or resetting the global offset direction indicator to its starting value at the end of a prefetcher period, there can still be some influence in past indications of global offset direction indicator, which reflects that there can still be some correlation between the workload behaviour in one prefetcher period and the workload behaviour seen in the next prefetcher period.

The use of global offset direction to adapt prefetching as discussed above can be applied to any prefetcher which generates prefetch requests based on offsets selected from a set of candidate offsets for which offset scores are maintained based on detection of offset-matching instances. One class of prefetchers which behave in this way are best-offset prefetchers.

In some examples, the prefetcher circuitry maintains a recent access table specifying addresses for a plurality of previous memory access requests. In response to a current memory access request that meets a training condition, the prefetcher circuitry may derive a plurality of candidate previous target addresses from a target address of the current memory access request and the plurality of candidate offsets, and update a given offset score associated with a given candidate offset based on whether the candidate previous target address generated based on the given candidate offset matches any of the addresses tracked in the recent access table. This approach enables a relatively large set of candidate offsets to be monitored for whether they could be the basis for useful prefetches, so that one or more best offsets can be selected from the set of candidate offsets based on the offset scores.

The training condition can be any condition used to select which memory access requests are used to train the prefetcher circuitry. For example, the training condition could depend on whether the current memory access request misses in a given level of cache (recognizing that prefetching data for target addresses of memory access requests that can already hit in the cache without prefetcher action may not improve performance, so it can be better to focus use of prefetch bandwidth on addresses of accesses which would miss in the cache in absence of prefetcher activity). Other implementations may train based on both accesses that miss and accesses that hit in the cache. Other examples of training conditions could be whether the memory access request is of a given type.

The update to the given offset score based on whether the candidate previous target address matches any of the addresses tracked in the recent access table can also depend on a timeliness condition as mentioned above. For example, each address tracked in the recent access table can be associated with a timeliness indication (e.g. a timeliness counter) which gives an indication of the time since the address was allocated into the recent access table, and if the timeliness indication indicates that the time since allocation is greater than a threshold, the timeliness condition may be considered satisfied for that previous memory access and so subsequent matches against that entry of the recent access table may be considered to satisfy the timeliness condition. Hence, a match in a given entry of the recent access table may trigger a greater boost to the corresponding offset score when the timeliness condition is satisfied than when the timeliness condition is not satisfied. As mentioned earlier, updates to the global offset direction indicator may be independent of whether the timeliness condition is satisfied for a given offset-matching instance.

Specific examples will now be described with reference to the drawings.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting address access patterns which can subsequently be used to predict addresses of future memory accesses. For example, the address access patterns may involve stride sequences of addresses where there are a number of addresses separated at regular intervals of a constant stride value, or where there are frequent occurrences of a given offset between addresses of one memory access and a later memory access. It is also possible to detect other kinds of address access patterns (e.g. a pattern where subsequent accesses target addresses at certain offsets from a start address). The prefetcher 40 maintains prefetch state information representing the observed address access patterns, and uses the prefetch state information to generate prefetch load requests which are issued to the memory system 6 to request that data is brought into a given level of cache. For example, when a trigger event for a given access pattern is detected (e.g. the trigger event could be program flow reaching a certain program counter address, or a load access to a particular trigger address being detected), the prefetcher 40 may begin issuing prefetch load requests for addresses determined according to that pattern. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled.

The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example could also issue level 2 prefetch requests to the level 3 cache 14 or main memory requesting that data from prefetch target addresses is loaded into the level 2 cache 14, and/or level 3 prefetch requests to the main memory requesting that data from prefetch target addresses is loaded into the level 3 cache 14. The level 2 or level 3 prefetch requests may look a longer distance into the future than the level 1 prefetch requests to account for the greater latency expected in obtaining data from main memory into the level 2 or 3 cache 12, 14 compared to obtaining data from a level 2 cache into the level 1 cache 10. In systems using prefetching into multiple levels of cache, prefetches at level 2 or 3 can increase the likelihood that data requested by a level 1 prefetch request or demand access request is already in the level 2 or 3 cache. However it will be appreciated that the particular caches loaded based on the prefetch requests may vary depending on the particular circuit implementation.

As shown in FIG. 1, as well as the demand target addresses issued by the load/store unit 30, the training of the prefetcher 40 may also be based on an indication of whether the corresponding demand memory access requests hit or miss in the level 1 data cache 10. The hits/miss indication can be used for filtering the demand target addresses from training. This recognises that it may not be useful to expend prefetch resource on addresses for which the demand target addresses would anyway hit in the cache. Performance improvement can be greater in focusing prefetcher training on those addresses which, in the absence of prefetching, would have encountered cache misses for the demand access requests.

While FIG. 1 shows a single instance of a prefetcher 40, it will be appreciated that some implementations may comprise more than one prefetcher, e.g. prefetchers trained to detect different kinds of memory access patterns and/or prefetchers trained on memory access requests processed by different levels of caches.

Figure 2:
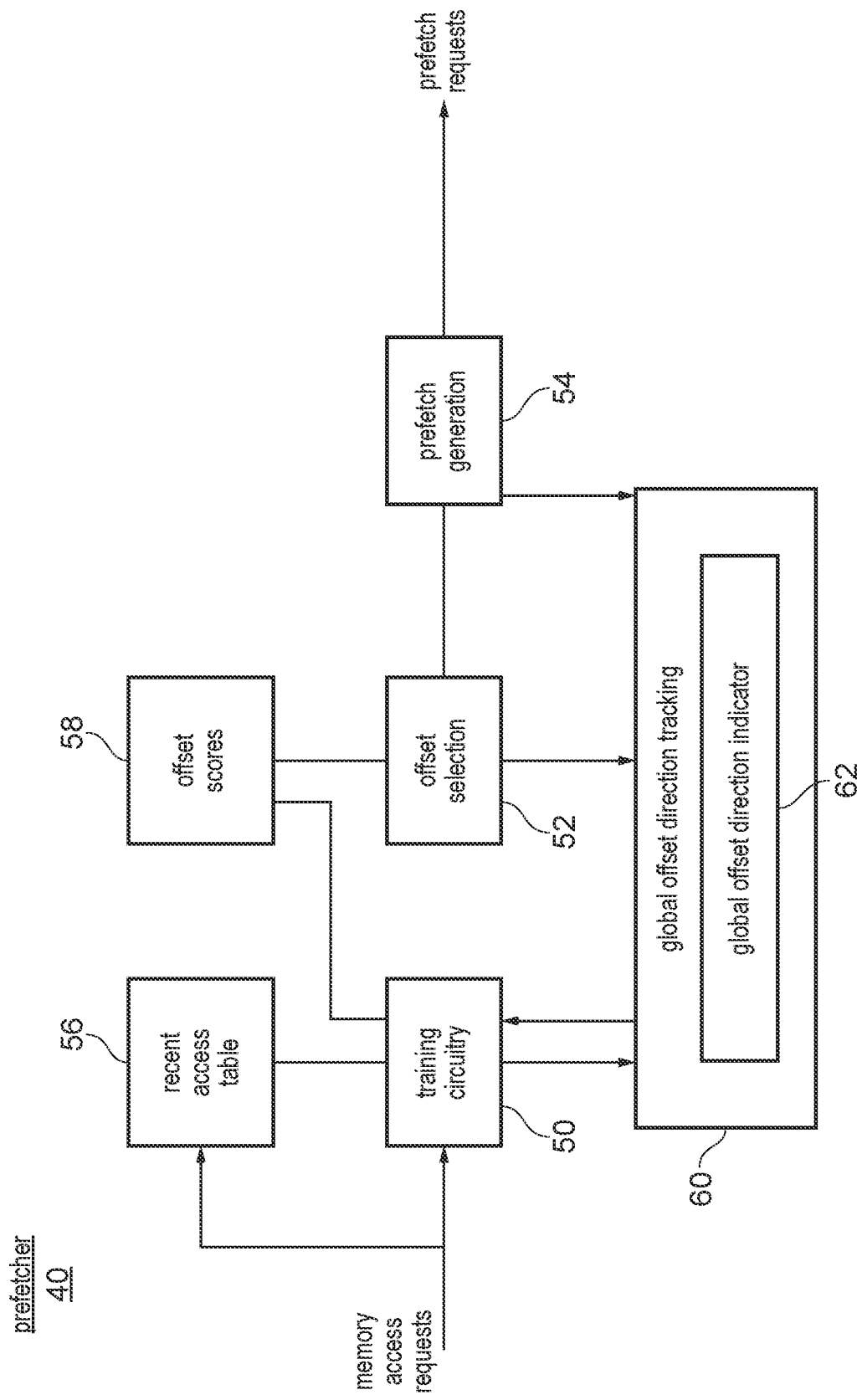
FIG. 2 illustrates an example of the prefetcher circuitry and global offset direction tracking circuitry.

FIG. 2 illustrates an example of prefetcher circuitry 40, which receives information on a stream of memory access requests, and generates prefetch requests based on training information derived from the stream of memory access requests. The prefetcher circuitry 40 comprises training circuitry 50, offset selection circuitry 52 and prefetch selection circuitry 54.

The training circuitry 50 maintains a recent access table 56 tracking addresses of a number of previous memory access requests seen in the stream of memory access requests. When a current memory access request is received in the stream, the training circuitry 50 applies a number of candidate offsets to the target address of the current memory access request (e.g. subtracting each candidate offset from the target address), and for each resulting address compares that address with the addresses of recent accesses tracked in the recent access table 56. Which particular offset values are included in the set of candidate offsets is a matter for implementation-specific choice. It is not essential that the offsets are consecutive (e.g. it would be possible to maintain a set of candidate offsets such as +1, +2, +4, +6, +8, +12 . . . without including every intervening offset—e.g. this example is missing +3, +5, +7, +9, +10, +11). Also while in general the set of candidate offsets includes both positive-direction offsets (e.g. +1, +2) and negative-direction offsets (e.g. −1, −2), it is not essential for the candidate set to be balanced in the number of positive-direction and negative-direction offsets (e.g. there can be more positive-direction offsets considered than negative-direction offsets, or vice versa). It is also not essential for both positive/negative direction offsets of the same magnitude to be provided (e.g. it would be possible to support a candidate offset of +n or −n even if there is no support for a corresponding offset of the opposite sign).

The training circuitry 50 maintains a set of offset scores 58, each offset score corresponding to one of the candidate offsets. If the difference between the target address of the current memory access request and the target address of one of the previous access requests tracked in the recent access table matches one of the candidate offsets, the training circuitry 50 applies a boost to the corresponding offset score for the matching candidate offset (e.g. an increment to the offset score, in an implementation where higher-valued offset scores are considered higher ranking than lower-valued offset scores). Over a period of training, therefore, the offset scores 58 will track which of the candle offsets are most likely to be useful for generating prefetch requests as they correspond to more-frequently occurring offsets between addresses of two memory access requests of the stream input for training.

The prefetcher 40 may operate using a period-based approach, based on prefetcher periods of a given length (e.g. a set number of processing cycles, a set number of memory accesses, etc.). Based on the offset scores 58 maintained by the training circuitry 50 during one prefetcher period, the offset selection circuitry 52 selects one or more "best" offsets to use as selected offsets for prefetch generation in a subsequent prefetcher period. The selected offsets could, in some examples, simply be the one or more candidate offsets with the highest-ranking offset scores 58. However, in other examples other selection algorithms may be applied. For example, a best offset could be selected which is a lowest common multiple of two or more candidate offsets having offset scores 58 which meet a selection criterion (e.g. exceeding a given threshold).

Based on the offsets selected by the offset selection circuitry 52, the prefetch generation circuitry 54 generates prefetch requests specifying a target address derived by applying the selected offset to an address of a trigger request (which could be a demand memory access request triggered by the load/store unit 30 executing an instruction, or could be an earlier prefetch request).

Figure 3:
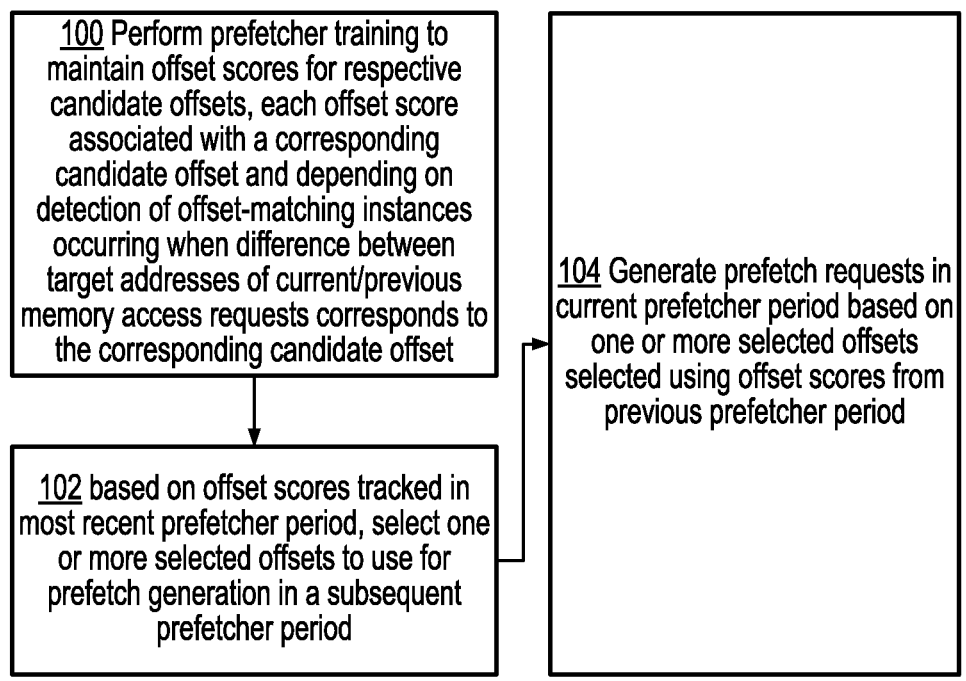
FIG. 3 illustrates an example of steps for best offset prefetching.

FIG. 3 is a flow diagram illustrating steps for best offset prefetching, performed by the prefetcher circuitry 40. At step 100, the training circuitry 50 performs prefetcher training to maintain offset scores 58 for respective candidate offsets. Each offset score is associated with a corresponding candidate offset and depends on detection of offset-matching instances. An offset-matching instance occurs for a given candidate offset when a difference between target addresses of the current memory access request in a previous memory access request corresponds to that candidate offset.

At step 102, based on the offset scores tracked in a most recent prefetcher period, the offset selection circuitry 52 selects one or more selected offsets to use for prefetch generation and a subsequent prefetcher period.

Meanwhile, at step 104, the prefetch generation circuitry 54 generates prefetch requests in a current prefetcher period based on the one or more selected offsets selected by the offset selection circuitry 52 using the offset scores 58 maintained by the training circuitry 50 in a previous prefetcher period.

Figure 4:
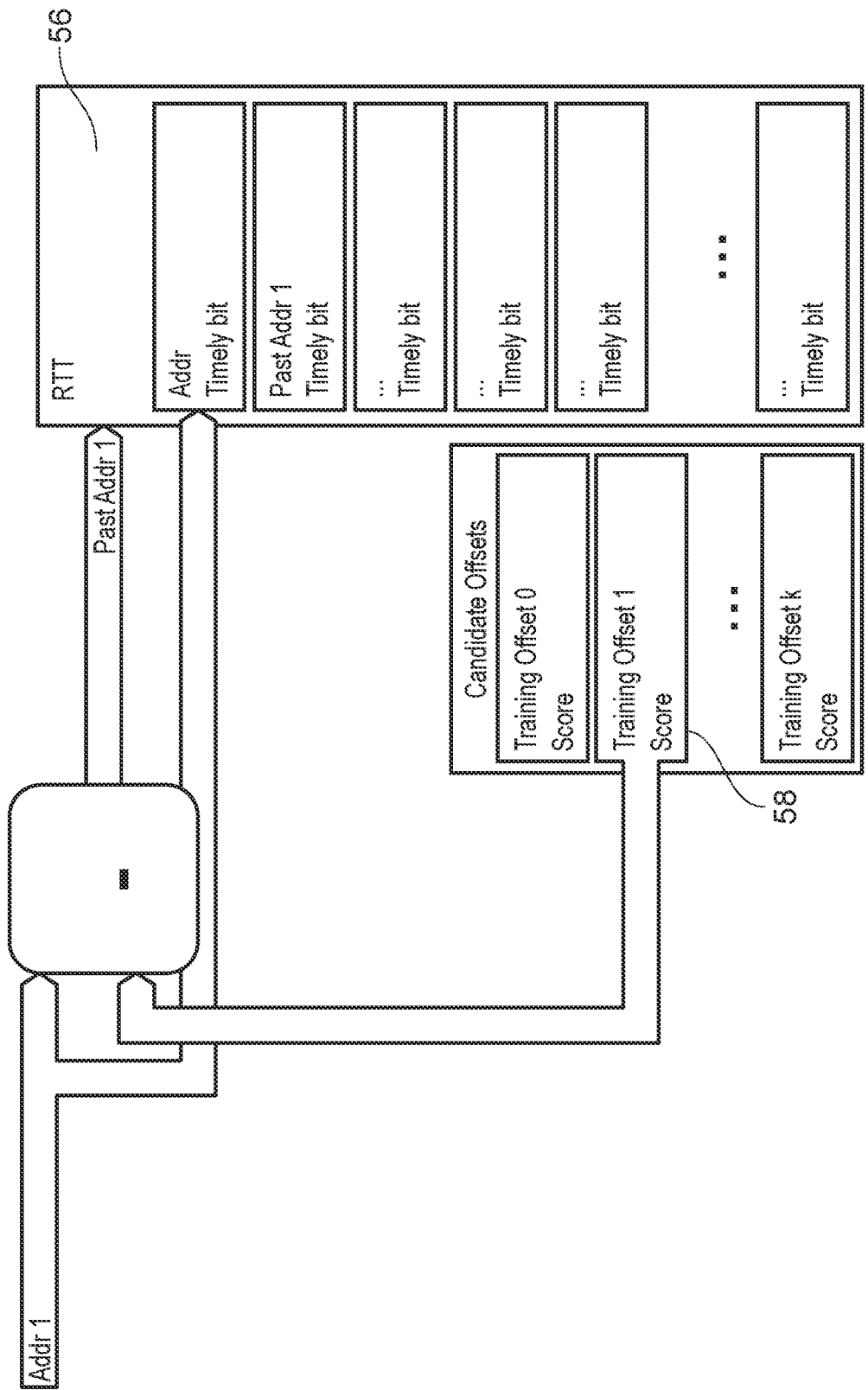
FIG. 4 schematically illustrates an example of best offset prefetching.

FIG. 4 illustrates the best offset prefetching in more detail. Each candidate offset used for training is associated with a corresponding offset score 58. When a current memory access request (specifying address Addr 1) is received, a number of candidate past addresses (Past Addr1) are generated, each candidate past address being generated by subtracting a corresponding one of the candidate offsets (which could be positive or negative) from the target address of the current memory access request. Each of those candidate past addresses is looked up in the recent access table 56, which has a number of entries specifying addresses of previous addresses. In this example, each entry of the recent access table 56 also specifies a timeliness indicator which indicates whether a timeliness condition is satisfied for that previous access. For example, the timeliness indicator could indicate whether the time since allocation of the entry is greater than a threshold time. While FIG. 4 shows an example where each timeliness indication is a single bit, the timeliness could also be tracked with a multi-bit counter which counts the time since allocation of the corresponding entry in the recent access table 56 (or the timeliness bit may be an upper bit of such a counter, which will become set when the time since allocation reaches a threshold time).

If one of the candidate past addresses generated relative to Addr1 matches an address in a corresponding entry of the recent access table 56, then the offset score 58 for the corresponding candidate offset used to derive the matching candidate past address is boosted. For example, each offset score may be a count value which (unless the counter has already reached its saturation value) is incremented by an increment value when an offset-matching instance is detected (i.e. when the candidate past address based on the corresponding candidate offset matches an address in the recent access table). The increment value can depend on whether the timeliness indicator indicates that a timeliness condition is satisfied for the matching address in the recent access table (with a greater boost to the offset score when the timeliness condition is satisfied than when the timeliness condition is not satisfied).

Figure 5:
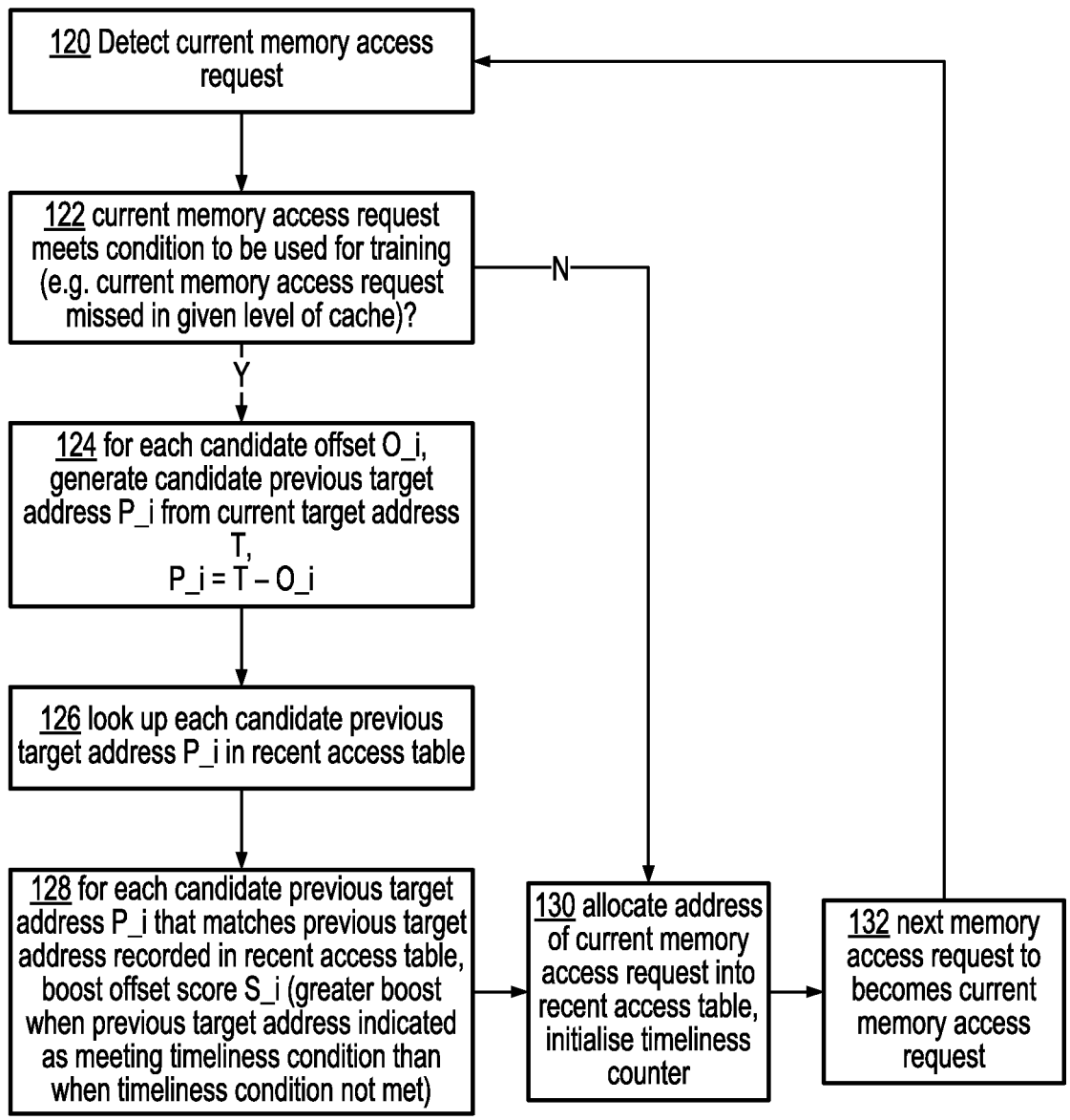
FIG. 5 illustrates steps for prefetcher training.

FIG. 5 is a flow diagram illustrating steps for prefetcher training performed by the training circuitry 50 of the prefetcher 40 based on the best-offset prefetching approach illustrated in FIG. 4. At step 120, the training circuitry 50 detects the current memory access request of the input memory access stream. At step 122, the training circuitry 50 determines whether the current memory access request meets a training condition required to be satisfied for the memory access in order for the current memory access request to be used for training. For example, the training condition could depend on whether the current memory access request missed in a given level of cache 10, 12, 14, and/or could depend on whether the current memory access request is of a particular class or type of memory access request.

If at step 122, the current memory access request is determined as meeting the training condition(s), then at step 124, for each candidate offset O_i in the set of offsets being trained (where i extends from 0 to k for a set of k+1 offsets being considered for training), a corresponding candidate previous target address P_i is generated from the target address T of the current memory access request, according to P_i=T−O_i. Hence, for positive offsets, P_i<T and for negative offsets P_i>T.

At step 126, the training circuitry 50 looks up each of the candidate previous target addresses P_i in the recent access table 56. At step 128, for each candidate previous target address P_i that matches a previous target address recorded in the recent access table, the training circuitry 50 boosts the corresponding offset score S_i which corresponds to the candidate offset O_i that was used to derive the candidate previous target address P_i that matched an address in the recent access table 56. A greater boost to the offset score S_i is applied in cases where the matching entry of the recent access table 56 indicates that a timeliness condition is satisfied than when the timeliness condition is indicated as not being satisfied. For example, the timeliness condition may be satisfied when a time since allocation of the entry providing the matching previous target address is greater than a threshold time. That threshold time may correspond to an estimate of a prefetch latency (the time taken between generation of a prefetch request and the data being allocated into a given level of cache 10, 12, 14 in response to that prefetch request). This can be tracked using performance counters which monitor prefetch latencies for previous prefetch requests generated by the prefetcher 40. Hence, the offset score is boosted more strongly when the offset-matching instance (instance when the difference between T and a previously seen target address corresponds to a given candidate offset O_i) occurs relative to a previous request older than a given threshold time, than when the offset-matching instance occurs relative to a previous request which is more recent than a given threshold. This is useful because if the time between previous and current requests involved in an offset-matching instance is too short, then even if a prefetch request is generated based on the corresponding offset, it may be unlikely that a subsequent instance of encountering the same two requests could benefit from triggering the prefetch request in response to seeing the first of the two requests, as by the time the prefetch request triggered by the first request causes allocation of data into the cache for the address generated by applying the offset to the address of the first request, the second of the two requests may already have happened (and missed in the cache) and so the prefetch may not improve performance significantly. It can be preferable to priorities prefetch generation bandwidth on prefetch requests generated based on offsets seen between memory access requests separated by a greater time.

Regardless of whether the current memory access request meets the training condition at step 122, at step 130 the address of the current memory access request can also be allocated into the recent access table to serve as a previous access request in a subsequent cycle of looking up the recent access table 56. Alternatively, some implementations might omit allocation into the recent access table 56 if the current memory access request does not meet the training condition. If a new entry is allocated into the recent access table specifying the target address T of the current memory access request, that entry initially specifies that the timeliness condition is not met for that entry, but subsequently after elapse of a given time period (corresponding to estimated prefetch latency as explained above), the entry may be indicated as meeting the timeliness condition. For example, a timeliness counter associated with the entry can be initialised when the entries first allocated and then subsequently incremented periodically, and when the counter reaches a threshold, the entry may be updated to indicate that the entry meets the timeliness condition.

At step 132, the next memory access request in the input stream of memory access requests becomes the "current" memory access request, and the method returns to step 120 for another pass of training based on that next memory access request.

Figure 6:
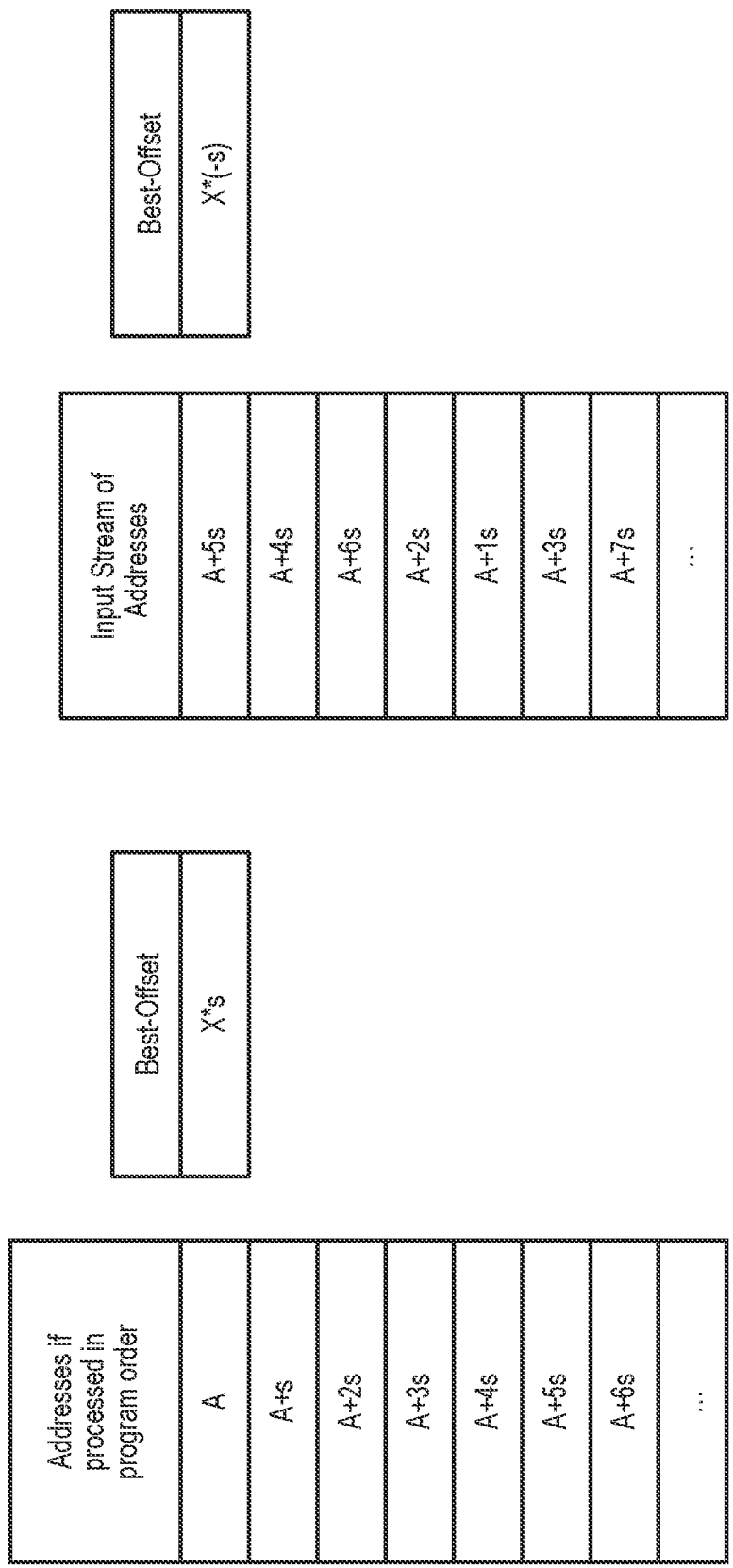
FIG. 6 illustrates re-ordering of addresses in a stream used for training the prefetcher circuitry.

One problem with best offset prefetching as in the examples discussed above can be that reordering of memory access requests (relative to the program order in which they are defined in an executed program) can lead to certain candidate offsets, which are in the opposite direction to the general trend of addresses accessed by a series of memory access requests, having higher-ranking offset scores than other offsets which might be a better predictor of the actual workload behaviour. FIG. 6 illustrates an example of such reordering, which may be caused by out-of-order execution of instructions for example. The original stream of address accesses, if processed in program order, may correspond to a series of addresses A, A+s, A+2s, etc. with a constant stride of +s, and so one might expect the best offset to select would be X's, where X is some constant (the timeliness conditions described earlier may result in a multiple of +s where X is 2 or more being selected as the selected offset in preference to using +s itself, as prefetching further ahead of the latest access in the stream can make it more likely the prefetch can be timely enough to benefit the later demand memory access request to the prefetched address).

However, as shown in the right hand side of FIG. 6, in an out-of-order processor, those memory accesses may actually be processed in an order different to the program order, and so the input stream of addresses could be encountered in an order such as the one seen in FIG. 6. In this case, there may be relatively frequent instances where the offset between two memory accesses is a negative offset, e.g. −s, leading to the negative offset having a higher ranking offset score than one would expect given that the overall trend of address evolution in the executed workload is in the positive offset direction. This could lead to an offset of X*-s being selected for prefetch generation, which may harm performance as the negative offset is unlikely to be a good predictor of addresses to be accessed in future and prefetching with such an offset may cause wasted memory system bandwidth and cause cache pollution by evicting data which is more likely to be accessed in future.

While FIG. 6 shows an example where the real program behaviour is based on positive address offsets and the incorrect behaviour detected as a best offset due to reordering artefacts is a negative offset, the opposite could be the case for other workloads where the true pattern of address development is based on a descending series of addresses and so a negative-direction offset would be preferred to a positive-direction offset. Also, while FIG. 6 is an example based on out-of-order execution, to illustrate how reordering artefacts can influence best offset selection, other examples may encounter reordering for other reasons, e.g. because memory accesses from two or more distinct streams of accesses become interleaved causing certain spurious offsets between a first access from one stream and a second access from another stream to affect the detection of the best offset to use for prefetching.

As shown in FIG. 2, the prefetcher 40 can be provided with global offset direction tracking circuitry 60 for maintaining a global offset direction indicator 62 which tracks a measure of the global direction of address development seen in the workload(s) being executed. The global offset direction indicator 62 tracks whether, in general, the cumulative frequency of offset-matching events is higher for positive-direction candidate offsets or negative-direction candidate offsets. The global offset direction indicator 62 can be imprecise, so it is not necessary to evaluate the exact frequency of offset-matching events for the positive-direction candidate offsets and negative-direction candidate offsets, but in general a measure can be maintained to track at least approximately whether offset matching is more frequent for positive-signed candidate offsets (e.g. +1, +2, etc.) or negative-signed candidate offsets (e.g. −1, −2 etc.).

The prefetcher 40 adapts its prefetching algorithm based on the global offset direction indicator 62, to reduce the likelihood that prefetch requests are generated based on a selected offset with the opposite offset direction to the global offset direction indicated by the global offset direction indicator 62. Hence, if the global offset direction is positive then the likelihood of generating prefetch requests based on negative offsets is reduced, and if the global offset direction is negative then the likelihood of generating prefetch requests based on positive offsets is reduced. There can also be an intermediate state where the global offset direction indicator 62 does not indicate any strong preference for either positive-direction or negative-direction offsets, in which case either the prefetcher 40 may generate prefetch requests based on a mixture of one or more positive-direction offsets and one or more negative-direction offsets, or prefetch generation can be suppressed to reduce likelihood of inaccurate prefetching causing performance loss.

Figure 7:
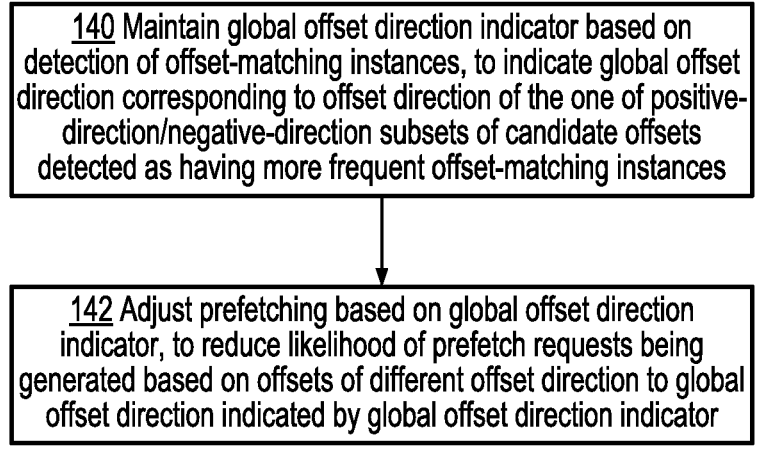
FIG. 7 illustrates steps for global offset direction tracking.

FIG. 7 schematically illustrates a method of controlling prefetching based on global offset direction. At step 140 the global offset direction tracking circuitry 60 maintains a global offset direction indicator 62 based on detection of offset-matching instances for the candidate offsets. An offset-matching instance occurs for a particular candidate offset when the difference between target addresses of the current memory access and the previously detected memory access corresponds to that candidate offset. The global offset direction indicator 62 indicates a global offset direction which corresponds to the offset direction of the one of a positive-direction subset of candidate offsets and a negative-direction subset of candidate offsets that is detected as having more frequent offset-matching instances. Hence, if there are more offset-matching instances for the positive-direction subset of candidate offsets than for the negative-direction subset of candidate offsets, the global offset direction may be the positive offset direction, and if there are more offset-matching instances for the negative-direction subset of candidate offsets than for the positive-direction subset of candidate offsets, the global offset direction may be the negative offset direction.

In some examples, the positive-direction subset of candidate offsets comprises all of the candidate offsets that have a positive sign, and the negative-direction subset of candidate offsets comprises all of the candidate offsets that have a negative same.

However, in other examples the positive-direction subset of candidate offsets considered for maintenance of the global offset direction indicator 62 may not include all positive-direction candidate offsets. Similarly, the negative-direction subset of candidate offsets considered for maintenance of the global offset direction indicator 62 may not include all negative-direction candidate offsets. For example, the subset of positive/negative-direction offsets considered for maintenance of the global offset direction indicator 62 could include those positive/negative-direction offsets whose magnitude is greater than or equal to a certain threshold (e.g. ±8 or ±16 say), so that the global offset direction indicator 62 is not updated based on offset-matching instances which occur for candidate offsets with lower magnitude than the threshold magnitude. This can be helpful as the window for reordering memory accesses in an out-of-order processor may be limited, so offsets with a larger offset magnitude may be more likely to reflect the global trend in address evolution from one memory access to the next in a given software workload when processed in absence of reordering. The particular threshold to use for selecting which offsets are considered for maintenance of the global offset direction indicator 62 may be a matter of design choice for a system designer, e.g. based on the size of a reorder buffer implemented for tracking out of order execution of instructions.

At step 142, the prefetcher circuitry 40 adapts the prefetching based on the global offset direction indicator 62, to reduce the likelihood of prefetch request being generated based on offsets of a different offset direction to the global offset direction indicated by the global offset direction indicator 62. A number of different options for adapting the prefetching based on the global offset direction indicator 62 are described below with reference to FIGS. 10-12. However, by performance analysis based on simulation of execution of common processing benchmark workloads, it has been established that adapting prefetching based on the global offset direction indicator 62 can improve performance by increasing prefetch accuracy and hence reducing cache pollution.

The global offset direction indicator 62 could be implemented in a number of different ways. For example, one technique could be to add the offset scores 58 of each of the positive-direction subset of offsets together, add the offset scores 58 for each of the negative-direction subset of offsets together, and compare the resulting totals to determine which of the positive-direction subset of offsets and negative-direction subset of offsets has the higher cumulative store, to determine whether the global offset direction is positive or negative. However, in practice such addition logic may be relatively slow and expensive in terms of circuit area.

Figure 8:
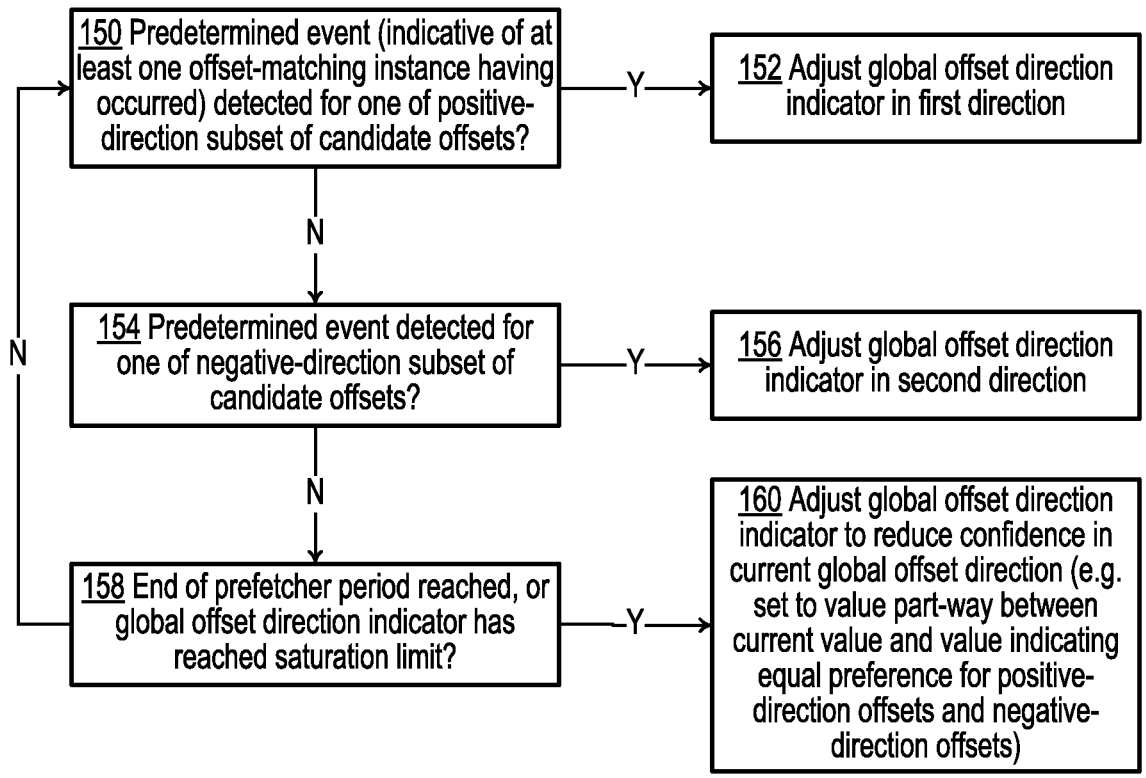
FIG. 8 illustrates steps for maintenance of a global offset direction indicator.
Figure 9:
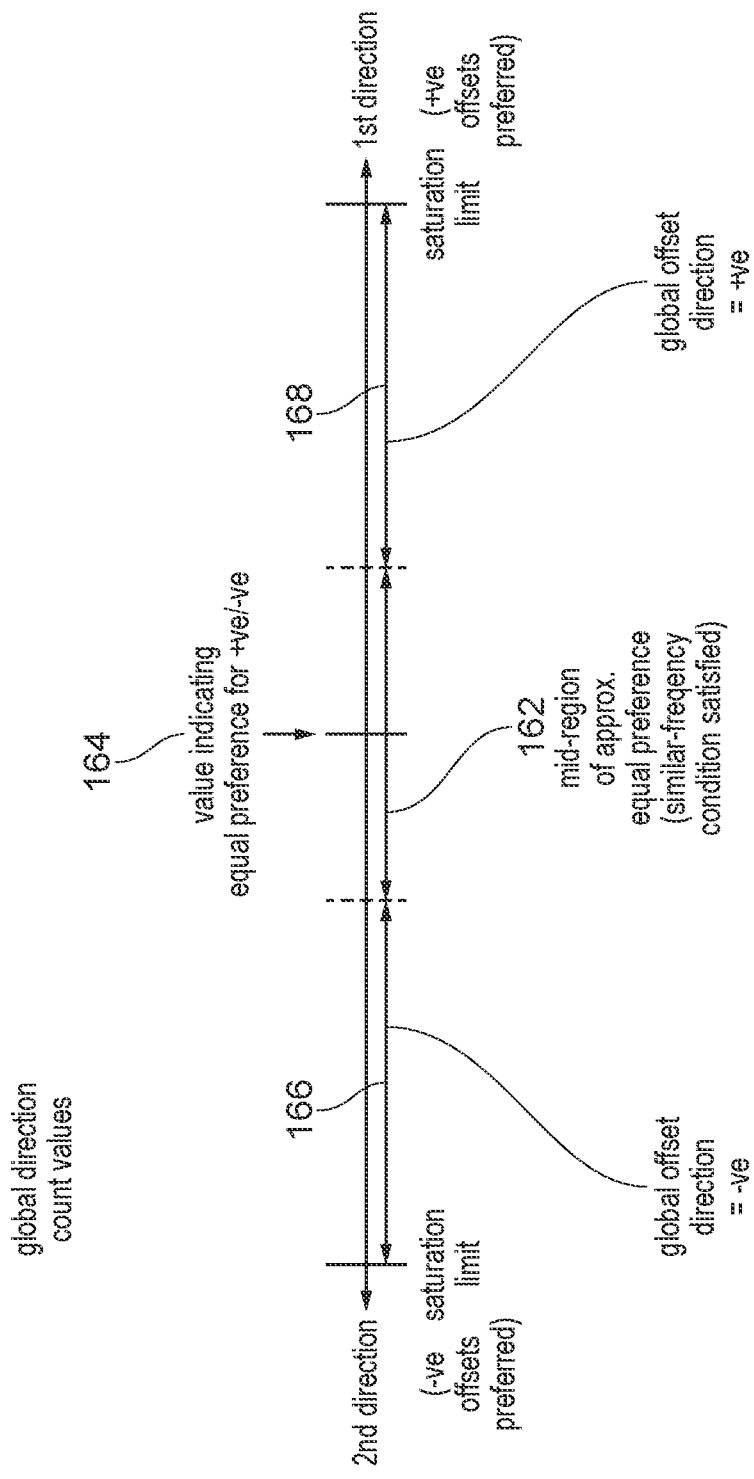
FIG. 9 illustrates use of a counter to track the global offset direction.

FIGS. 8 and 9 show a more efficient technique for maintaining the global offset direction indicator 62, implemented using a counter. FIG. 8 is a flow diagram showing steps for maintaining the global offset direction indicator 62 (e.g. this can implement step 140 of FIG. 7). At step 150, the global offset direction tracking circuitry 60 determines whether a predetermined event has been detected for one of the positive-direction subset of candidate offsets. The predetermined event is an event which is indicative of at least one offset-matching instance having occurred for one of the positive-direction subset of candidate offsets. For example, this predetermined event could simply be the occurrence of an offset-matching instance for one of the positive-direction subset of candidate offsets. Alternatively, the predetermined event could be the offset score 58 for one of the positive-direction subset of candidate offsets reaching a given threshold. If the predetermined event occurs, then at step 152, the global offset direction tracking circuitry 60 adjusts the counter of the global offset direction indicator 62 in a first direction (e.g. increments or decrements the counter).

On the other hand, if at step 154 the predetermined event is detected for one of the negative-direction subset of candidate offsets, then at step 156 the count value of the global offset direction indicator 62 is adjusted in a second direction (opposite to the first direction). For example, first direction could be an increment to the counter and the second direction could be a decrement to the counter, or vice versa.

The counter may have a finite number of bits and so if enough instances of the predetermined event occur for offsets of the same offset direction, the counter may reach its saturation limit. In this case, further instances of the predetermined event do not cause a further increment/decrement of the counter.

Also, it may be useful to periodically apply some ageing to the count value to reduce the confidence with which the global direction is indicated as either positive/negative, as otherwise a strong bias of offset direction in one section of a workload may adversely affect prefetcher accuracy for a later section of a workload with a different address access pattern. Therefore, at step 158 the global offset direction tracking circuitry 60 also determines whether either the end of a current prefetcher period has been reached, or the global offset direction indicator 62 has reached its saturation limit in either the first direction or the second direction. If this is the case, then at step 160, the global offset direction indicator 62 is adjusted to reduce confidence in the currently indicated global offset direction. For example, this could be done by adjusting the value of the counter to a value part-way (e.g. half-way) between this current value and a value indicating equal preference for both positive-direction offsets and negative-direction offsets. For example, if the value indicating equal preference for positive/negative-direction offsets is zero, this could be implemented by right-shifting the current value of the counter by one bit position, to approximately halve the current count value.

Hence, as shown in FIG. 9, when considering the range of possible values of the counter used as the global offset direction indicator 62, which is adjusted in a first direction to indicate a greater likelihood that the global offset direction is the positive offset direction and is adjusted in a second direction to indicate a greater likelihood that the global offset direction is negative offset direction, the range includes a mid-region 162 where a "similar-frequency condition" is satisfied, indicating that there is no strong preference for either positive-direction or negative-direction offsets. The mid-region 162 is a region surrounding the value 164 (e.g. zero) which indicates equal preference for both offset directions (on a reset event occurring when the apparatus 2 is first powered up or a reset signal is asserted to reset the apparatus 2 to a default state, the counter may be reset to the mid-point value 164). The mid-region 162 may extend for a certain number of counter increments outside that mid-point value 164. For example, if the mid-point value 164 is zero, the similar-frequency condition may be considered to be satisfied when the current counter value (positive or negative) has a magnitude less than or equal to a given threshold. Outside that mid-region 162, there is a region 166 closest to the saturation value in the second direction that indicates that the global offset direction is the negative offset direction and a region 168 closest to the saturation value in the first direction which indicates that the global offset direction is the positive offset direction. The prefetcher 40 can adapt its prefetching depending on whether a current value of the global offset direction indicator 62 is in the mid-region 162 (for which the global offset direction could be either positive or negative, depending on which side of the mid-point value 164 the current value is), the negative-offset-preferred region 166 (for which the global offset direction is indicated as the negative offset direction) or the positive-offset-preferred region 168 (for which the global offset direction is indicated as the positive offset direction).

Figure 10:
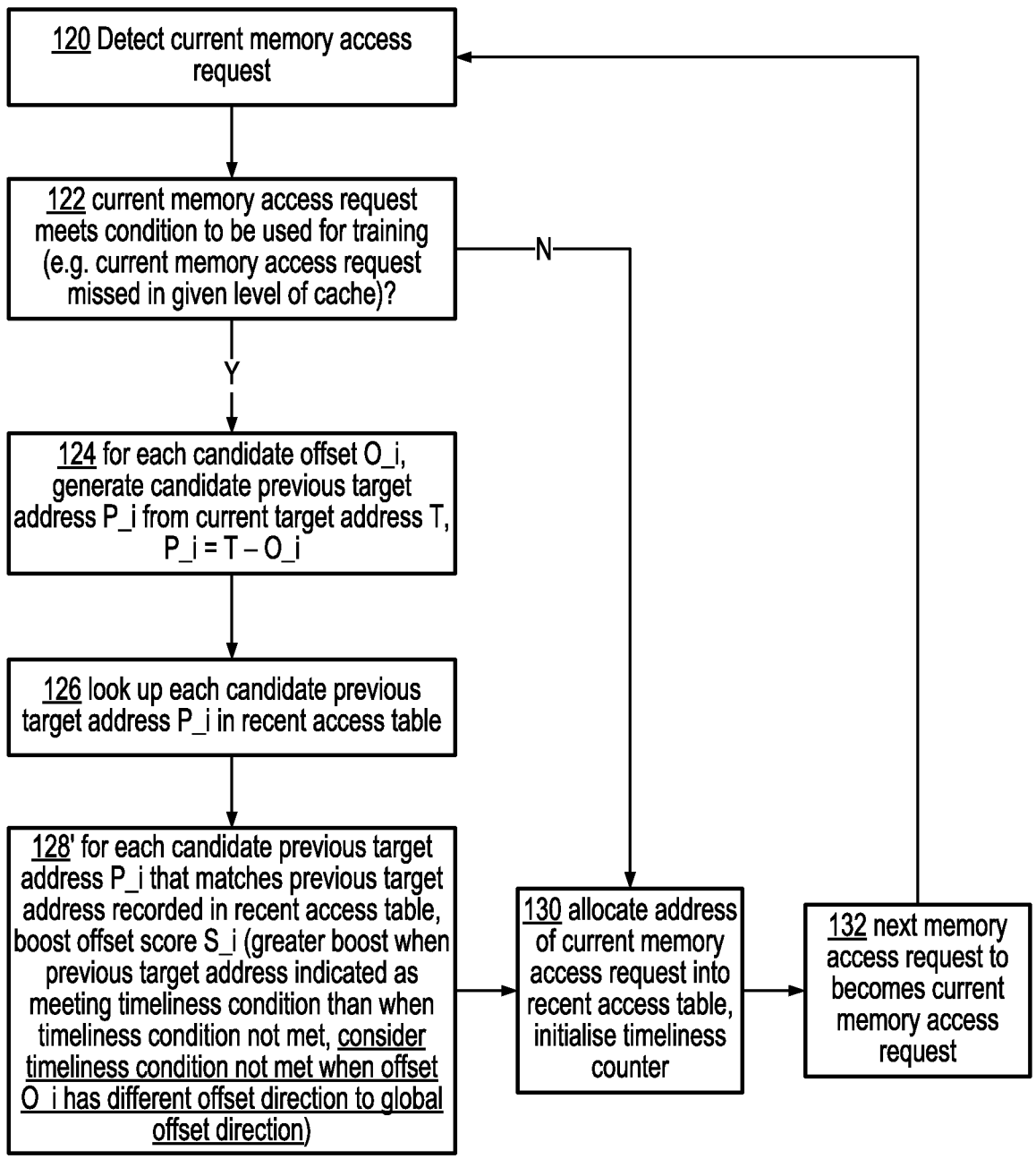
FIG. 10 illustrates steps for adapting prefetcher training based on the global offset direction.
Figure 11:
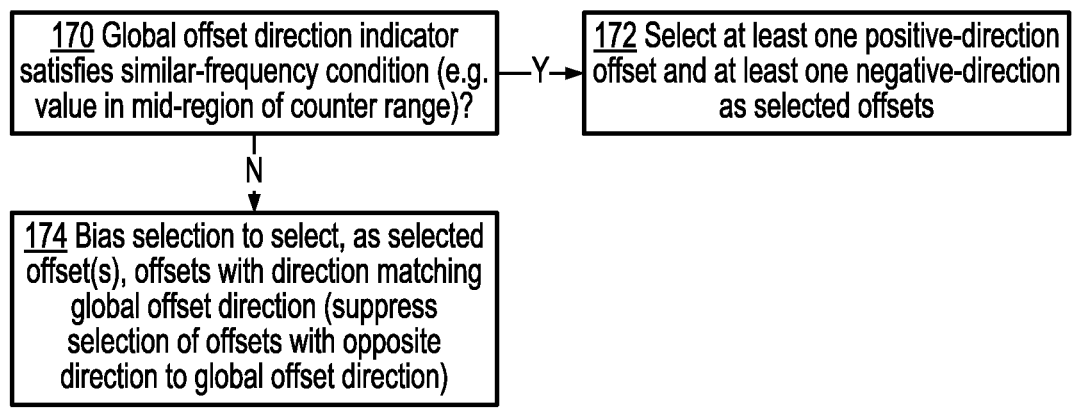
FIG. 11 illustrates steps for adapting offset selection based on the global offset direction.
Figure 12:
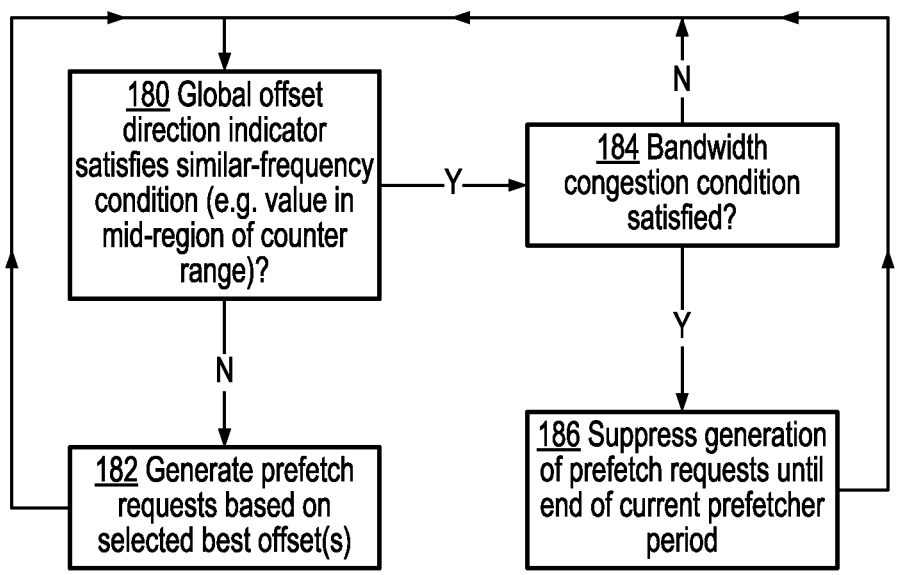
FIG. 12 illustrates steps for adapting prefetch generation based on the global offset direction.

There are various ways in which prefetching can be adapted based on the global offset direction indicator 62. For example, any one or more of the training circuitry 50, offset selection circuitry 52 and/or prefetch generation circuitry 54 can adapt its function based on the global offset direction indicator 62. FIGS. 10, 11 and 12 show a number of examples of implementing step 142 of FIG. 7, which could be used individually or in combination.

FIG. 10 illustrates steps for adjusting the prefetcher training performed by the training circuitry 50, based on the global offset direction indicated by the global offset direction indicator 62. Steps 120, 122, 124, 126, 130, 132 are the same as the corresponding steps described earlier for FIG. 5, so are not described again here. Step 128' (for updating the offset score S_i in response to an offset-matching instance detected for candidate offset O_i when P_i=T-O_i) is similar to step 128 of FIG. 5, in that for each the offset score S_i is boosted by an amount which depends on whether the timeliness condition is met. However, for step 128' of FIG. 10, the timeliness condition is considered not to be met in the case when the candidate offset O_i for which the offset-matching instance was detected has a different offset direction to the global offset direction indicated by the global offset direction indicator.

For example, if the current counter value for the global offset direction indicator 62 is in the negative-preferred region 166, then if O_i is a positive offset then the score update function may treat the timeliness condition as if it is not met (even if it is actually met) while if O_i is a negative offset then whether the timeliness condition is met depends on whether the time between the current memory access request and the previous memory access that matched in the table is greater than a threshold time. On the other hand, if the current counter value for the global offset direction indicator 62 is in the positive-preferred region 168, then if O_i is a negative offset then the score update function may treat the timeliness condition as if it is not met (even if it is actually met), while if O_i is a positive offset then whether the timeliness condition is met depends on whether the time between the current memory access request and the previous memory access that matched in the table is greater than the threshold time.

If the current counter value is in the mid-region 162, the confidence in the global direction may be low enough that it is not necessary to force the timeliness condition to be not met, or alternatively the timeliness condition might be considered not met anyway. Alternatively, with the counter value in the mid-region 162, the global offset direction may still be determined based on which side of the mid-point value 164 the current value of the counter is, and the timeliness condition may be considered not met if the global offset direction is opposite to the sign of the offset O_i. Hence, if the current value is in the mid-region 162 there could be a variety of ways of handling the score update.

With this approach, at least in cases with higher confidence of a positive or negative offset direction (when the counter value is in region 166 or 168), the greater boost that would normally be applied when the timeliness condition is satisfied for a given offset-matching instance is suppressed when the global offset direction differs from the direction of the offset. This reduces the likelihood that offsets in the opposite direction to the global offset direction will reach higher offset scores, reducing the likelihood of such candidate offsets being selected for prefetch generation, and hence reducing risk of cache pollution in scenarios such as the reordering scenario shown in FIG. 6.

Another way of adapting prefetching based on the global offset direction can be to adjust the offset selection algorithm applied by the offset selection circuitry 52. For example, as shown in FIG. 11, at step 170 the offset selection circuitry 52 checks whether the global offset direction indicator 62 satisfies a similar-frequency condition, which indicates that the frequency of offset-matching events is approximately the same (e.g. with less than a threshold amount of difference) for both positive-direction offsets and negative-direction offsets. For example, the offset selection circuitry 52 can determine whether the similar-frequency condition is satisfied based on checking whether the current value of the counter for the global offset direction indicator 62 is in the mid-range region 162. If the global offset direction indicator 62 indicates that the similar-frequency condition is satisfied, then (at least for implementations which permit more than one offset to be selected for prefetch generation in the same round of offset selection), at step 172, the offset selection circuitry selects at least one positive-direction offset and at least one negative-direction offset, within the set of two or more candidate offsets that are selected for prefetch generation. By ensuring that offsets of both signs are selected in cases where the global offset direction indicator 62 does not express a strong preference for either offset direction, this can make it more likely that the prefetcher 62 can generate useful prefetches. When the similar-frequency condition is satisfied, implementations of the offset selection circuitry 52 which only permit a single offset to be selected per round of offset selection could simply select the offset which best satisfies its selection criteria, regardless of whether that offset is positive or negative.

On the other hand, if the global offset direction indicator does not satisfy the similar-frequency condition, so that a stronger preference for either the positive offset direction or the negative offset direction is indicated (e.g. this may occur when the counter value is in one of regions 166, 168), then at step 174 the offset selection is biased to select, as one or more selected offsets to be provided to the prefetch generation circuitry 54 for use in prefetch generation, one or more offsets which have an offset direction which matches the global offset direction indicated by the global offset direction indicator 62. Hence, selection of offsets with the opposite offset direction to the global offset direction can be suppressed. Therefore, if the counter value is in region 166 then negative candidate offsets are selected based on their offset scores and selection of positive candidate offsets is suppressed, while if the counter value is in region 168 then positive candidate offsets are selected based on their offset scores and selection of negative candidate offsets is suppressed.

If the counter value is in the mid-region 162 then either the offsets of the opposite direction to the global direction can be suppressed from being selected (with global direction being dependent on whether the current count value is greater or less than the mid-point value 164), or alternatively the relatively low confidence in global offset direction could be an indication that no offsets should have their chances of selection suppressed, and so the mid-region 162 could be interpreted as not indicating any particular global offset direction, so that both positive and negative candidate offsets are available for selection if the global offset direction indicator 62 has a value in the mid-region 162.

Hence, with this approach, this can reduce the likelihood of an offset being selected which has an offset direction opposite to the general trend in address offsets seen in a stream of memory accesses, and hence reduce cache pollution by redundant prefetches which do not correspond to a later memory access.

Another way of adjusting prefetcher behaviour based on the global offset direction can be to focus on the generation of prefetch requests by the prefetch generation circuitry 54. For example, as shown in FIG. 12, at step 180, the prefetch generation circuitry 54 may determine whether the global offset direction indicator 62 satisfies the similar-frequency condition (for example based on whether the counter value is in the mid-range region 162). If the similar-frequency condition is not satisfied (i.e. there is a relatively strong preference for either offsets with positive sign or offsets with negative sign), then at step 182 prefetch generation is enabled and prefetch request may be generated based on the selected best offset(s) selected by the offset selection circuitry 52. However, if the global offset direction indicator satisfies the similar-frequency condition (step 180) and a bandwidth congestion condition is satisfied (step 184) then at step 186 generation of prefetch request may be suppressed until the end of the current prefetcher. This recognises that if there is relatively low confidence in the global offset direction, this may be an indication that the software workload is relatively equally likely to use positive offsets as negative offsets, so any particular offset selected for prefetch circuitry may be as likely to generate incorrect prefetches (which do not correspond to future demand access behaviour) as correct prefetches (which specify an address later accessed by a demand access triggered by instruction execution). Hence, at least if memory system bandwidth is scarce, it may be better to avoid prefetching at all to reduce reductions in performance caused by cache pollution and using up limited system bandwidth which could be better used for other access requests.]

While FIG. 12 shows step 186 suppressing the generation of prefetch requests only if the bandwidth congestion condition and similar-frequency condition are both satisfied (steps 180, 184), other examples may omit the bandwidth congestion condition and may suppress generation of prefetch requests when the global offset direction indicator 62 satisfies the similar-frequency condition (Y at step 180), even if the bandwidth congestion condition is not satisfied (e.g. step 184 can be omitted and the method may pass from step 180 direct to step 186 if the similar-frequency condition is satisfied).

In implementations which do consider the bandwidth congestion condition at step 184, the detection of whether the bandwidth congestion condition is satisfied at step 184 could be based on a variety of methods. For example, the prefetcher could estimate the level of bandwidth congestion based on monitoring of prefetch latency for a number of prefetch requests, where the prefetch latency is the time between issuing of a prefetch request and the corresponding data becoming allocated into a cache—the prefetch latency will tend to increase with increasing bandwidth congestion. Alternatively, other performance metrics could be used to track bandwidth congestion, including metrics which may be derived from monitoring of demand memory access latency not just prefetch requests.

FIGS. 10, 11 and 12 show three techniques for adapting prefetching based on the global offset direction indicator 62. It will be appreciated that any one or more of these techniques could be used in combination.

For all the flowcharts discussed above, while the flowcharts show steps being performed in a particular order, it will be appreciated that some steps could be reordered, e.g. steps which do not involve a dependency between them could be performed in the opposite order or at least partially in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 13:
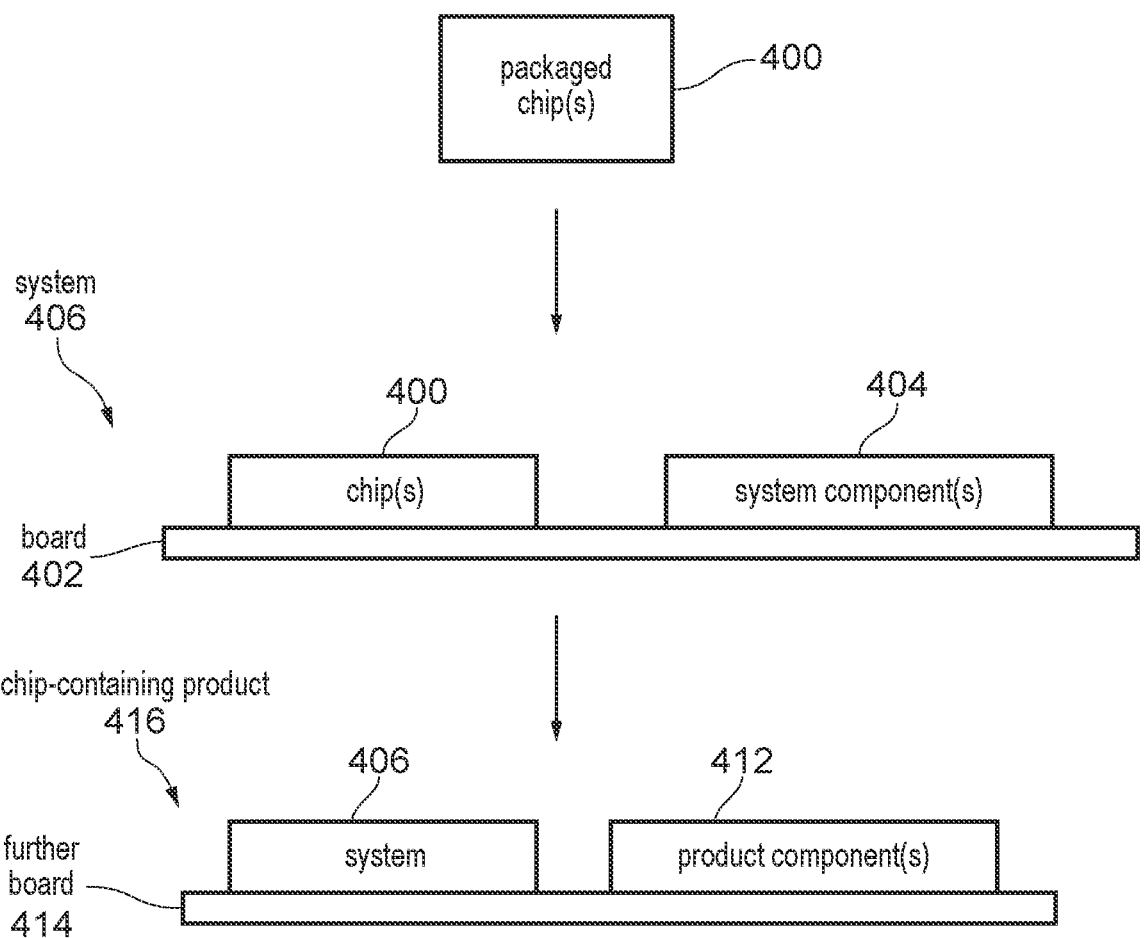
FIG. 13 illustrates a system and a chip-containing product.

As shown in FIG. 13, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

SOME EXAMPLES ARE SET OUT IN THE FOLLOWING CLAUSES

1. An apparatus comprising:
    prefetcher circuitry to perform prefetching, the prefetching comprising:
        performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
        selecting, based on the offset scores for the plurality of candidate offsets, one or more selected offsets; and
        generating prefetch requests using the one or more selected offsets;
    and
    global offset direction tracking circuitry to maintain a global offset direction indicator indicative of a global offset direction; in which:
    in response to detecting that the offset-matching instances are detected as occurring more frequently for a positive-direction subset of the candidate offsets than for a negative-direction subset of the candidate offsets, the global offset direction tracking circuitry is configured to set the global offset direction indicator to indicate a positive offset direction as the global offset direction;
    in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and
    the prefetcher circuitry is configured to adapt the prefetching based on the global offset direction indicator.

2. The apparatus according to clause 1, in which the prefetcher circuitry is configured to adapt the prefetching based on the global offset direction indicator to reduce a likelihood that prefetch requests are generated based on an offset having a different offset direction to the global offset direction indicated by the global offset direction indicator.

3. The apparatus according to any of clauses 1 and 2, in which the prefetcher circuitry is configured to adapt the prefetcher training based on the global offset direction indicator.

4. The apparatus according to clause 3, in which in response to an offset-matching instance being detected as occurring for a given candidate offset corresponding to a given offset score, the prefetcher circuitry is configured to adjust, depending on whether the given candidate offset has a different offset direction to the global offset direction indicated by the global offset direction indicator, an amount by which the given offset score is updated in response to detection of the offset-matching instance.

5. The apparatus according to any of clauses 3 and 4, in which, in response to the offset-matching instance being detected as occurring for a given candidate offset corresponding to a given offset score,
when the given candidate offset has a same offset direction as the global offset direction indicated by the global offset direction indicator, the prefetcher circuitry is configured to boost the given offset score by a greater amount when a time between the previous memory access request and the current memory access request meets a timeliness condition than when the time between the previous memory access request and the current memory access request does not meet the timeliness condition; and
when the given candidate offset has a different offset direction to the global offset direction indicated by the global offset direction indicator, the prefetcher circuitry is configured to boost the given offset score by an amount corresponding to the timeliness condition not being met, even if the timeliness condition is actually met for that offset-matching instance.

6. The apparatus according to any of clauses 1 to 5, in which the prefetcher circuitry is configured to adapt selection of the one or more selected offsets based on the global offset direction indicator.

7. The apparatus according to clause 6, in which the prefetcher circuitry is configured to bias selection of the one or more selected offsets to provide a higher likelihood that a candidate offset with a same offset direction as the global offset direction is selected as one of the one or more selected offsets than that a candidate offset with a different offset direction to the global offset direction is selected as one of the one or more selected offsets.

8. The apparatus according to any of clauses 6 and 7, in which, in response to detection that the global offset direction indicator satisfies a similar-frequency condition indicative of a difference between a frequency of offset-matching instances for the positive-direction subset of offsets and a frequency of offset-matching instances for the negative-direction subset of offsets being less than a threshold, the prefetcher circuitry is configured to select, as a plurality of selected offsets selected from among the candidate offsets, at least one positive-direction offset and at least one negative-direction offset.

9. The apparatus according to any of clauses 1 to 8, in which the prefetcher circuitry is configured to adapt generation of the prefetch requests based on the global offset direction indicator.

10. The apparatus according to clause 9, in which the prefetcher circuitry is configured to suppress generation of prefetch requests based on a selected offset having a different offset direction to the global offset direction indicated by the global offset direction indicator.

11. The apparatus according to any of clauses 9 and 10, in which, at least when a bandwidth congestion condition is satisfied, in response to detection of the global offset direction indicator satisfying a similar-frequency condition indicative of a difference between a frequency of offset-matching instances for the positive-direction subset of offsets and a frequency of offset-matching instances for the negative-direction subset of offsets being less than a threshold, the prefetcher circuitry is configured to suppress generation of prefetch requests based on any of the one or more selected offsets.

12. The apparatus according to any of clauses 1 to 11, in which the global offset direction indicator comprises a global offset direction counter;
the global offset direction tracking circuitry is configured to adjust the global offset direction counter in a first direction in response to a predetermined event dependent on at least one offset-matching instance being detected as occurring for one of the positive-direction subset of offsets and to adjust the global offset direction counter in a second direction in response to the predetermined event occurring for one of the negative-direction subset of offsets.

13. The apparatus according to clause 12, in which, for a given candidate offset associated with a given offset score, the predetermined event comprises one of:
occurrence of an offset-matching instance for the given candidate offset; and
the given offset score reaching or exceeding a threshold score.

14. The apparatus according to any of clauses 1 to 13, in which the positive-direction subset of candidate offsets comprises candidate offsets with a positive offset direction and an offset magnitude exceeding a threshold magnitude; and the negative-direction subset of candidate offsets comprises candidate offsets with a negative offset direction and an offset magnitude exceeding the threshold magnitude.

15. The apparatus according to any of clauses 1 to 14, in which the prefetcher circuitry is configured to perform the prefetcher training in respective prefetcher periods, and select, based on the offset scores derived by performing the prefetcher training in a given prefetcher period, the one or more selected offsets to be used to generate prefetch requests in a subsequent prefetcher period.

16. The apparatus according to clause 15, in which in response to elapse of a current prefetcher period, the global offset direction tracking circuitry is configured to adjust the global offset direction indicator to reduce a confidence associated with identification of the global offset direction.

17. The apparatus according to any of clauses 1 to 16, in which the prefetcher circuitry is configured to maintain a recent access table specifying addresses for a plurality of previous memory access requests; and
in response to a current memory access request that meets a training condition, the prefetcher circuitry is configured to derive a plurality of candidate previous target addresses from a target address of the current memory access request and the plurality of candidate offsets, and to update a given offset score associated with a given candidate offset based on whether the candidate previous target address generated based on the given candidate offset matches any of the addresses tracked in the recent access table.

18. A system comprising:
the apparatus of any of clauses 1 to 17, implemented in at least one packaged chip;
at least one system component; and
a board,
wherein the at least one packaged chip and the at least one system component are assembled on the board.

19. A chip-containing product comprising the system of clause 18 assembled on a further board with at least one other product component.

20 A method comprising:
performing prefetching, the prefetching comprising:
performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
selecting, based on the offset scores for the plurality of candidate offsets, one or more selected offsets; and
generating prefetch requests using the one or more selected offsets;
maintaining a global offset direction indicator indicative of a global offset direction;
in response to detecting that the offset-matching instances are detected as occurring more frequently for a positive-direction subset of the candidate offsets than for a negative-direction subset of the candidate offsets, setting the global offset direction indicator to indicate a positive offset direction as the global offset direction;
in response to detecting that the offset-matching instances are detected as occurring more frequently for the negative-direction subset of the candidate offsets than for the positive-direction subset of the candidate offsets, setting the global offset direction indicator to indicate a negative offset direction as the global offset direction; and
adapting the prefetching based on the global offset direction indicator.

21 Computer-readable code for fabrication of an apparatus comprising:
prefetcher circuitry to perform prefetching, the prefetching comprising:
performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
selecting, based on the offset scores for the plurality of candidate offsets, one or more selected offsets; and
generating prefetch requests using the one or more selected offsets;
and
global offset direction tracking circuitry to maintain a global offset direction indicator indicative of a global offset direction; in which:
in response to detecting that the offset-matching instances are detected as occurring more frequently for a positive-direction subset of the candidate offsets than for a negative-direction subset of the candidate offsets, the global offset direction tracking circuitry is configured to set the global offset direction indicator to indicate a positive offset direction as the global offset direction;
in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and
the prefetcher circuitry is configured to adapt the prefetching based on the global offset direction indicator.

22 A computer-readable medium storing the computer-readable code of clause 21.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
prefetcher circuitry to perform prefetching, the prefetching comprising:
performing prefetcher training configured to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
selecting, based on the offset scores for the plurality of candidate offsets, one or more selected offsets; and
generating prefetch requests using the one or more selected offsets; and
global offset direction tracking circuitry configured to maintain a global offset direction indicator indicative of a global offset direction indicative of whether, among the plurality of candidate offsets, the offset-matching instances are detected more frequently for a positive-direction subset of the plurality of candidate offsets or a negative-direction subset of the plurality of candidate offsets; in which:

in response to detecting that the offset-matching instances are detected as occurring more frequently for the positive-direction subset of the candidate offsets than for the negative-direction subset of the candidate offsets, the global offset direction tracking circuitry is configured to set the global offset direction indicator to indicate a positive offset direction as the global offset direction;

in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and the prefetcher circuitry is configured to adapt the prefetching based on the global offset direction indicator.

2. The apparatus according to claim 1, in which the prefetcher circuitry is configured to adapt the prefetching based on the global offset direction indicator to reduce a likelihood that prefetch requests are generated based on an offset having a different offset direction to the global offset direction indicated by the global offset direction indicator.

3. The apparatus according to claim 1, in which the prefetcher circuitry is configured to adapt the prefetcher training based on the global offset direction indicator.

4. The apparatus according to claim 3, in which in response to an offset-matching instance being detected as occurring for a given candidate offset corresponding to a given offset score, the prefetcher circuitry is configured to adjust, depending on whether the given candidate offset has a different offset direction to the global offset direction indicated by the global offset direction indicator, an amount by which the given offset score is updated in response to detection of the offset-matching instance.

5. The apparatus according to claim 3, in which, in response to the offset-matching instance being detected as occurring for a given candidate offset corresponding to a given offset score, when the given candidate offset has a same offset direction as the global offset direction indicated by the global offset direction indicator, the prefetcher circuitry is configured to boost the given offset score by a greater amount when a time between the previous memory access request and the current memory access request meets a timeliness condition than when the time between the previous memory access request and the current memory access request does not meet the timeliness condition; and when the given candidate offset has a different offset direction to the global offset direction indicated by the global offset direction indicator, the prefetcher circuitry is configured to boost the given offset score by an amount corresponding to the timeliness condition not being met, even if the timeliness condition is actually met for that offset-matching instance.

6. The apparatus according to claim 1, in which the prefetcher circuitry is configured to adapt selection of the one or more selected offsets based on the global offset direction indicator.

7. The apparatus according to claim 6, in which the prefetcher circuitry is configured to bias selection of the one or more selected offsets to provide a higher likelihood that a candidate offset with a same offset direction as the global offset direction is selected as one of the one or more selected offsets than that a candidate offset with a different offset direction to the global offset direction is selected as one of the one or more selected offsets.

8. The apparatus according to claim 6, in which, in response to detection that the global offset direction indicator satisfies a similar-frequency condition indicative of a difference between a frequency of offset-matching instances for the positive-direction subset of offsets and a frequency of offset-matching instances for the negative-direction subset of offsets being less than a threshold, the prefetcher circuitry is configured to select, as a plurality of selected offsets selected from among the candidate offsets, at least one positive-direction offset and at least one negative-direction offset.

9. The apparatus according to claim 1, in which the prefetcher circuitry is configured to adapt generation of the prefetch requests based on the global offset direction indicator.

10. The apparatus according to claim 9, in which the prefetcher circuitry is configured to suppress generation of prefetch requests based on a selected offset having a different offset direction to the global offset direction indicated by the global offset direction indicator.

11. The apparatus according to claim 9, in which, at least when a bandwidth congestion condition is satisfied, in response to detection of the global offset direction indicator satisfying a similar-frequency condition indicative of a difference between a frequency of offset-matching instances for the positive-direction subset of offsets and a frequency of offset-matching instances for the negative-direction subset of offsets being less than a threshold, the prefetcher circuitry is configured to suppress generation of prefetch requests based on any of the one or more selected offsets.

12. The apparatus according to claim 1, in which the global offset direction indicator comprises a global offset direction counter;

the global offset direction tracking circuitry is configured to adjust the global offset direction counter in a first direction in response to a predetermined event dependent on at least one offset-matching instance being detected as occurring for one of the positive-direction subset of offsets and to adjust the global offset direction counter in a second direction in response to the predetermined event occurring for one of the negative-direction subset of offsets.

13. The apparatus according to claim 12, in which, for a given candidate offset associated with a given offset score, the predetermined event comprises one of:

occurrence of an offset-matching instance for the given candidate offset; and the given offset score reaching or exceeding a threshold score.

14. The apparatus according to claim 1, in which the positive-direction subset of candidate offsets comprises candidate offsets with a positive offset direction and an offset magnitude exceeding a threshold magnitude; and the negative-direction subset of candidate offsets comprises candidate offsets with a negative offset direction and an offset magnitude exceeding the threshold magnitude.

15. The apparatus according to claim 1, in which the prefetcher circuitry is configured to perform the prefetcher training in respective prefetcher periods, and select, based on the offset scores derived by performing the prefetcher training in a given prefetcher period, the one or more selected offsets to be used to generate prefetch requests in a subsequent prefetcher period.

16. The apparatus according to claim 15, in which in response to elapse of a current prefetcher period, the global offset direction tracking circuitry is configured to adjust the global offset direction indicator to reduce a confidence associated with identification of the global offset direction.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A method comprising:
performing prefetching, the prefetching comprising:
performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
selecting, based on the offset scores for the plurality of candidate offsets, one or more selected offsets; and
generating prefetch requests using the one or more selected offsets;
maintaining a global offset direction indicator indicative of a global offset direction, indicative of whether, among the plurality of candidate offsets, the offset-matching instances are detected more frequently for a positive-direction subset of the plurality of candidate offsets or a negative-direction subset of the plurality of candidate offsets;
in response to detecting that the offset-matching instances are detected as occurring more frequently for the positive-direction subset of the candidate offsets than for the negative-direction subset of the candidate offsets, setting the global offset direction indicator to indicate a positive offset direction as the global offset direction;
in response to detecting that the offset-matching instances are detected as occurring more frequently for the negative-direction subset of the candidate offsets than for the positive-direction subset of the candidate offsets, setting the global offset direction indicator to indicate a negative offset direction as the global offset direction; and
adapting the prefetching based on the global offset direction indicator.

20. A non-transitory computer-readable medium to store computer-readable code for fabrication of an apparatus comprising:
prefetcher circuitry to perform prefetching, the prefetching comprising:
performing prefetcher training to maintain offset scores for a plurality of candidate offsets, each offset score being associated with a corresponding candidate offset and depending on detection of offset-matching instances occurring when a difference between target addresses of a current memory access request and a previous memory access request corresponds to the corresponding candidate offset;
selecting, based on the offset scores for the plurality of candidate offsets, one or more selected offsets; and
generating prefetch requests using the one or more selected offsets; and
global offset direction tracking circuitry to maintain a global offset direction indicator indicative of a global offset direction, indicative of whether, among the plurality of candidate offsets, the offset-matching instances are detected more frequently for a positive-direction subset of the plurality of candidate offsets or a negative-direction subset of the plurality of candidate offsets; in which:
in response to detecting that the offset-matching instances are detected as occurring more frequently for the positive-direction subset of the candidate offsets than for the negative-direction subset of the candidate offsets, the global offset direction tracking circuitry is configured to set the global offset direction indicator to indicate a positive offset direction as the global offset direction;
in response to detecting that the offset-matching instances are detected as occurring more frequently for the negative-direction subset of the candidate offsets than for the positive-direction subset of the candidate offsets, the global offset direction tracking circuitry is configured to set the global offset direction indicator to indicate a negative offset direction as the global offset direction; and
the prefetcher circuitry is configured to adapt the prefetching based on the global offset direction indicator.

* * * * *